United States Patent
Casasanta

(10) Patent No.: US 9,350,012 B2
(45) Date of Patent: May 24, 2016

(54) RECHARGEABLE ORGANOSODIUM POLYMER BATTERY

(75) Inventor: Vincenzo Casasanta, Woodinville, WA (US)

(73) Assignee: EMPIRE TECHNOLOGY DEVELOPMENT, LLC, Wilmington, DE (US)

( * ) Notice: Subject to any disclaimer, the term of this patent is extended or adjusted under 35 U.S.C. 154(b) by 0 days.

(21) Appl. No.: 13/390,329

(22) PCT Filed: Sep. 23, 2011

(86) PCT No.: PCT/US2011/052872
§ 371 (c)(1),
(2), (4) Date: Feb. 13, 2012

(87) PCT Pub. No.: WO2013/043186
PCT Pub. Date: Mar. 28, 2013

(65) Prior Publication Data
US 2013/0078499 A1    Mar. 28, 2013

(51) Int. Cl.
*H01M 4/60* (2006.01)
*H01M 10/0564* (2010.01)
*H01M 10/058* (2010.01)
(Continued)

(52) U.S. Cl.
CPC .............. *H01M 4/137* (2013.01); *H01M 4/60* (2013.01); *H01M 10/054* (2013.01); *H01M 10/058* (2013.01); *H01M 10/0564* (2013.01); *H01M 4/602* (2013.01); *Y02E 60/122* (2013.01); *Y10T 29/49108* (2015.01)

(58) Field of Classification Search
USPC ........................................................ 429/213
See application file for complete search history.

(56) References Cited

U.S. PATENT DOCUMENTS 4,526,708 A * 7/1985 Elsenbaumer et al. .. 252/519.21
4,557,985 A 12/1985 Voss et al.
(Continued)

FOREIGN PATENT DOCUMENTS

JP        2012204185 A1    10/2012

OTHER PUBLICATIONS

Nagamoto et al., "Polyacetylene Battery with Polymeric Solid Electrolyte," 1985, Japanese Journal of Applied Physics, vol. 24, No. 6, pp. L397-L398.*

(Continued)

*Primary Examiner* — Ula C Ruddock
*Assistant Examiner* — Matthew Van Oudenaren
(74) *Attorney, Agent, or Firm* — Turk IP Law, LLC

(57) ABSTRACT

Technologies are generally described for electrochemical cells and batteries containing electrochemical cells. An electrochemical cell may incorporate two types of conducting polymers each located at an electrode, a cation, a polycyclic aromatic hydrocarbon radical anion that contacts one of the conducting polymers, and an electrolyte. The polycyclic aromatic hydrocarbon radical anion may be a covalent substituent of one of the conducting polymers or may be in noncovalent contact with one of the conducting polymers. The polycyclic aromatic hydrocarbon radical anion may permit the use of cations other than lithium, e.g. an alkali metal cation such as sodium or alkali earth metal cation such as calcium. Such an electrochemical cell may provide alternative batteries to existing lithium ion batteries, permitting the use of cations that may be more abundant, more easily extracted, or more sustainable compared to known lithium supplies.

12 Claims, 16 Drawing Sheets

(51) Int. Cl.
*H01M 4/137* (2010.01)
*H01M 10/054* (2010.01)

(56) References Cited

U.S. PATENT DOCUMENTS

| | | | |
|---|---|---|---|
| 4,609,600 A | | 9/1986 | Heinze et al. |
| 4,672,093 A | * | 6/1987 | Wnek et al. ............... 525/356 |
| 4,695,521 A | | 9/1987 | Shacklette et al. |
| 4,772,940 A | * | 9/1988 | Wudl et al. ............... 348/803 |
| 5,348,818 A | * | 9/1994 | Asami et al. ............... 429/213 |
| 5,637,421 A | * | 6/1997 | Poehler et al. ............... 429/303 |
| 2001/0006749 A1 | | 7/2001 | Shackle |
| 2001/0014420 A1 | * | 8/2001 | Takeuchi et al. ............... 429/209 |
| 2002/0042002 A1 | * | 4/2002 | Noh et al. ............... 429/314 |
| 2004/0214081 A1 | | 10/2004 | Nobuta et al. |
| 2007/0154813 A1 | * | 7/2007 | Sato et al. ............... 429/246 |
| 2008/0213645 A1 | * | 9/2008 | Akita ............... 429/33 |

OTHER PUBLICATIONS

Bruno Scrosati, Jurgen Garche, "Lithium batteries: Status, prospects and future", Journal of Power Sources 195 (2010) 2419-2430.

N. Akuzawa et al., "Preparation and Characterization of Sodium-Graphite Intercalation Compounds", Mol. Cryst. Liq. Cryst. vol. 388, Issue 1, Jan. 2002, pp. 1-7.

W. Williams et al., "Double Injection Electroluminescence in Anthracene and Carrier Injection Properties of Carbon Fibres", J. Phys. Chem. Solids 33 (1972) 1879-1884.

N. P. Blake et al., "Structure of Hydrated Na-Nafion Polymer Membranes", J. Phys Chem. 109 (2005) 24244-24253.

D. Billaud et al., "Electrochemical Intercalation of Polyacetylene with Alkali Metals (Lithium, Sodium, and Potassium) in Solid State Cells", Electrochimica Acta 37 (1992) 1675-1679.

C. Hérold et al., "Electrochemical Doping of Polyparaphenylene with Alkali Metals in Solid State Cells", Solid State Ionics 40/41 (1990) 985-987.

Colin Pratt, Conducting Polymers, http://www.ims.vanderbilt.edu/mse150/wittig10/cpoly.pdf, 8 pages.

J.G. Killian et al., Polypyrrole Composite Electrodes in an All-Polymer Battery System, Department of Material Sciences and Engineering, The Johns Hopkins University. Baltimore, Maryland. J. Electrochem. Soc. vol. 143. No. 3. Mar. 1996. 936-942.

M. Dubois et al., "Electrochemical impedance spectroscopy study of the inthercalation of lithium and sodium into polyparaphenylene in carbonate-based electrodes", Electrochimica Acta 47 (2002) 4459-4466.

International Search Report and Written Opinion PCT/US11/052872 mailed Nov. 18, 2011.

P. Ge et al., "Electrochemical Intercalation of Sodium in Graphite", Solid State Ionics, 28-30 (1988) 1172-1175.

A. Metrot et al., "New Results About the Sodium-Graphite System" Synthetic Metals Synthetic Metals, vol. 1, Issue 4, Sep. 1980, pp. 363-369.

J. Barker et al., "A Sodium-Ion Cell Based on the Fluorophosphate Compound NaVPO4F", Electrochem. Solid-State Lett. 6 (2003) A1.

Dubois, "Don't believe a word about electric cars and the coming lithium shortage"; http://money.cnn.com/2010/07/12/news/companies/electric_vehicle_lithium_shortage.fortune/index.htm, CNN Money, Jul. 2010.

International Preliminary Report on Patentability for PCT/US2011/052872 filed Sep. 23, 2011, mailed on Apr. 3, 2014, issued Mar. 25.

Office Action received for Japanese Patent Application No. 2014-530644 on Mar. 17, 2015.

\* cited by examiner 406    408    410

412    414

416    418

430

432

434

RECHARGEABLE ORGANOSODIUM POLYMER BATTERY

CROSS-REFERENCES TO RELATED APPLICATION

This Application is the National Stage filing under 35 U.S.C. §371 of PCT Application Ser. No. PCT/US2011/052872 filed on Sep. 23, 2011. The PCT Application is hereby incorporated by reference in its entirety.

BACKGROUND

Unless otherwise indicated herein, the materials described in this section are not prior art to the claims in this application and are not admitted to be prior art by inclusion in this section.

Lithium ion batteries are commonly used in electronics. Electrochemically, Li+ is a small, light, and mobile cation. Lithium has contributed to significant advances in portability, capacity, and rechargeability of lithium ion batteries. For example, lithium's high mobility in olefinic carbonates and polyethylene oxide has made for efficient electrolytes. In comparison to other alkali metals, lithium readily intercalates with graphite to make reversible carbon and graphite electrodes. Also, lithium metal oxide chemistry has provided various oxide matrices with reversible lithium ion redox and transport.

The popularity of lithium batteries, however, has raised concerns regarding supply and sustainability, since natural, easily extractible sources of lithium are limited. Also, because the lithium ion battery market is anticipated to grow dramatically, there has been an active search to identify other natural sources of lithium compounds and alternatives to lithium based batteries.

More abundant alkali elements such as sodium have been investigated as substitutes for lithium, but lithium replacement has been challenging. For example, in graphite electrodes, sodium does not intercalate as easily as lithium. Also, while sodium metal oxides have been researched for use as electrodes, the mobility of sodium in oxide matrices has been observed to be lower than lithium in corresponding lithium oxides. The present disclosure appreciates that implementing other alkali metals as substitutes for lithium ion battery technology may be a complex undertaking.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes electrochemical cells comprising conducting polymers and metal cations.

An example electrochemical cell may include a first electrode that may include a first conducting polymer and at least one polycyclic aromatic hydrocarbon radical anion adapted to contact the first conducting polymer. The example electrochemical cell may also include a second electrode that may include a second conducting polymer, and a cation. The example electrochemical cell may also include an electrolyte adapted to conductively couple the first and the second conducting polymers, the polycyclic aromatic hydrocarbon radical anion, and the cation.

The present disclosure also describes an example battery that may include one or more electrochemical cells. The electrochemical cell may include a first electrode that may include a first conducting polymer and at least one polycyclic aromatic hydrocarbon radical anion adapted to contact the first conducting polymer. The electrochemical cell may also include a second electrode that may include a second conducting polymer, and a cation. The electrochemical cell may also include an electrolyte adapted to conductively couple the first and the second conducting polymers, the polycyclic aromatic hydrocarbon radical anion, and the cation.

The present disclosure further describes methods of making the electrochemical cells. An example method of making an electrochemical cell may include forming a first electrode from a first conducting polymer, where the first conducting polymer contacts a polycyclic aromatic hydrocarbon. The example method may also include forming a second electrode from a second conducting polymer. The example method may further include contacting the polycyclic aromatic hydrocarbon with a metal. The example method may also include conductively coupling an electrolyte to the first and the second conducting polymers, the polycyclic aromatic hydrocarbon, and the metal. The example method may further include reducing the polycyclic aromatic hydrocarbon to form a polycyclic aromatic hydrocarbon radical anion and oxidizing the metal to form a metal cation.

The present disclosure also describes an example computer-readable storage medium having instructions stored thereon for making an electrochemical cell. The instructions on the example computer-readable storage medium may include forming a first electrode from a first conducting polymer, the first conducting polymer including a polycyclic aromatic hydrocarbon. The instructions may also include forming a second electrode from a second conducting polymer. The instructions may further include contacting the polycyclic aromatic hydrocarbon with a metal. The instructions may also include conductively coupling an electrolyte to the first and the second conducting polymers, the polycyclic aromatic hydrocarbon, and the metal. The instructions may further include reducing the polycyclic aromatic hydrocarbon to form a polycyclic aromatic hydrocarbon radical anion and oxidizing the metal to form a metal cation.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

Figure 1A:
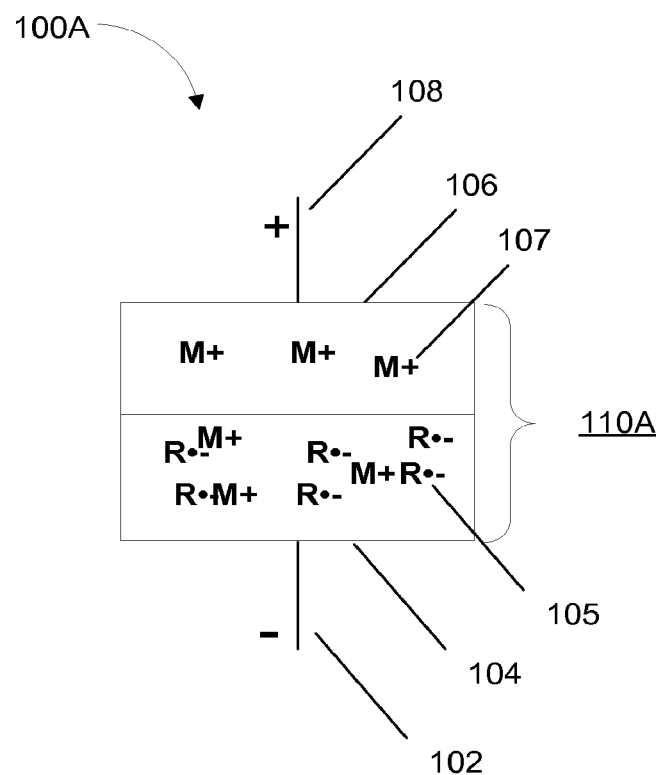
FIG. 1A is a conceptual drawing of an electrochemical cell that may include a first electrode with a first conducting polymer, and a second electrode with a second conducting polymer; a polycyclic aromatic hydrocarbon radical anion R−; and a metal cation M+, all conductively coupled by an electrolyte solution.
Figure 1B:
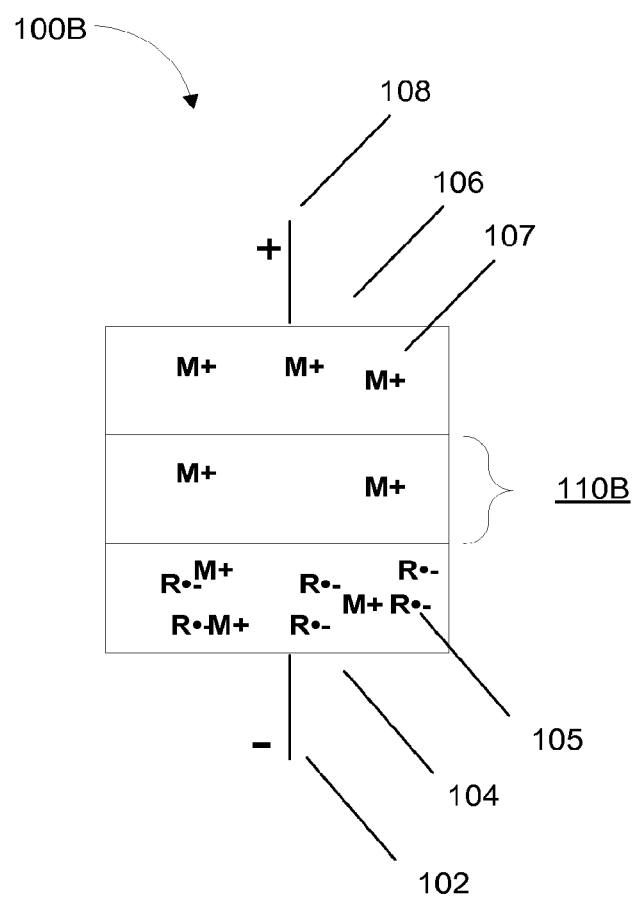
FIG. 1B is a conceptual drawing of an electrochemical cell that may include a first electrode with a first conducting polymer, and a second electrode with a second conducting polymer; a polycyclic aromatic hydrocarbon radical anion R.−; and a metal cation M+, all conductively coupled by a solid ionomer electrolyte membrane.
Figure 2A:
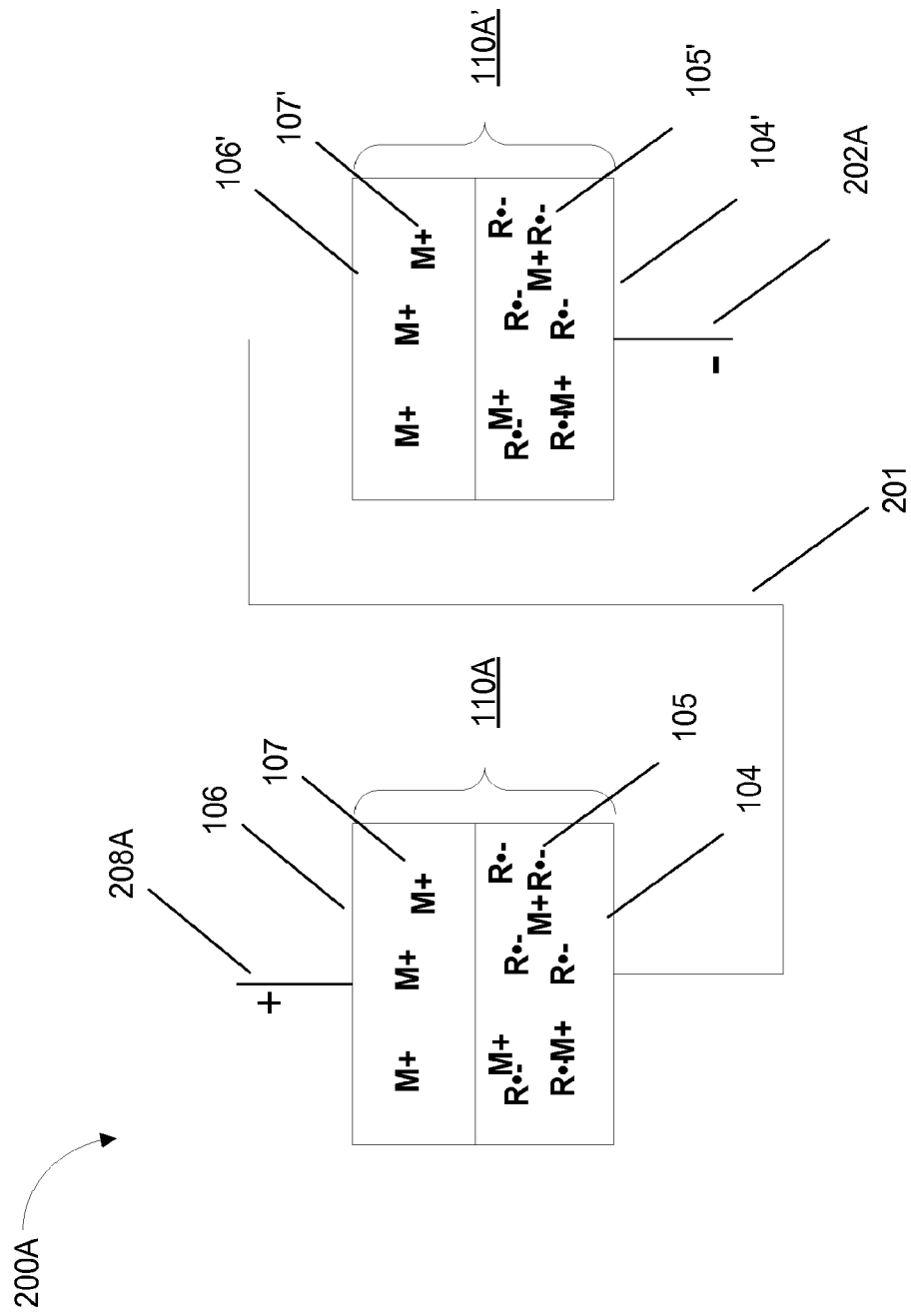
FIG. 2A is a conceptual drawing of an example battery that may include two of the example electrochemical cells of FIG.
Figure 2B:
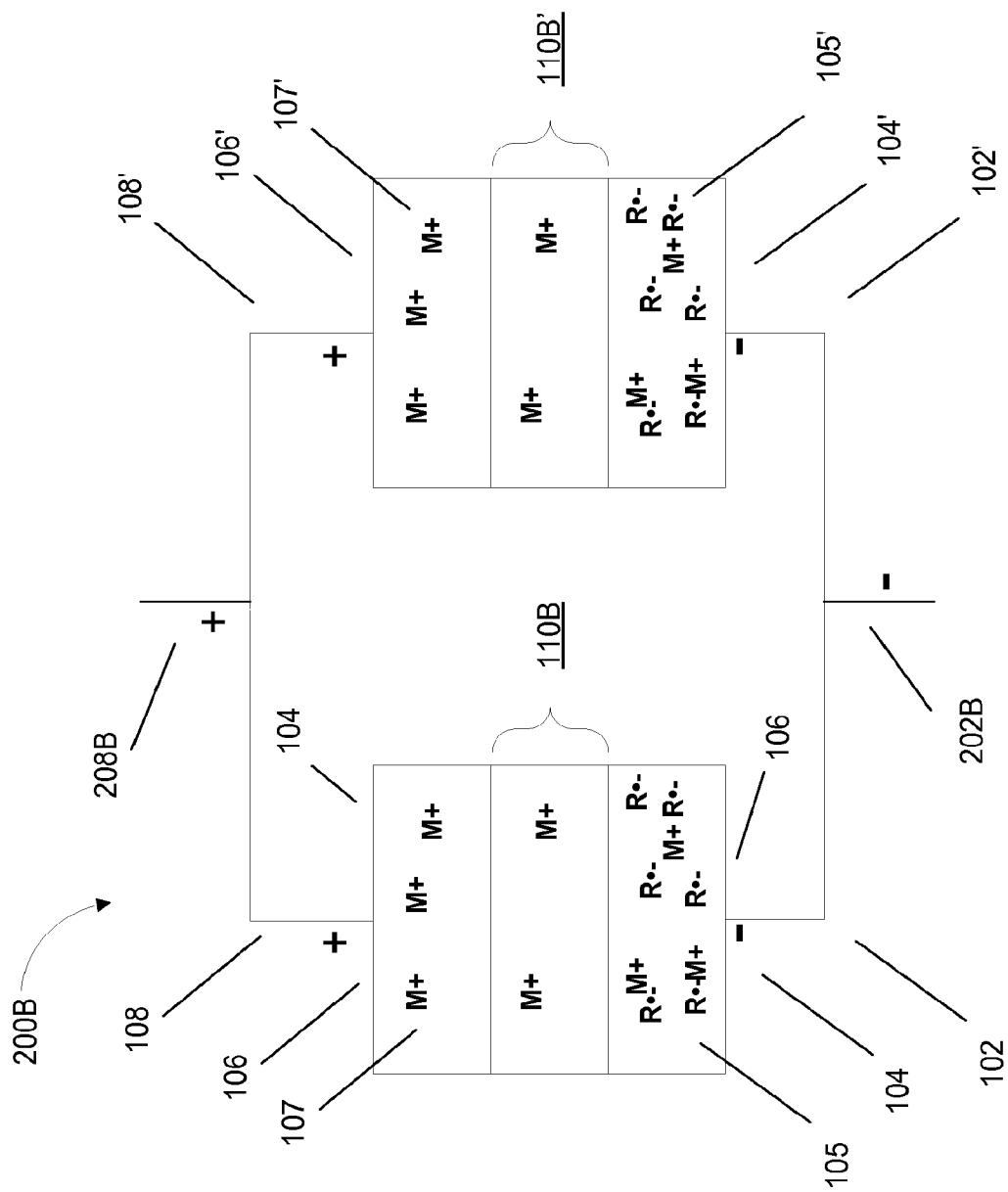
Figure 3A:
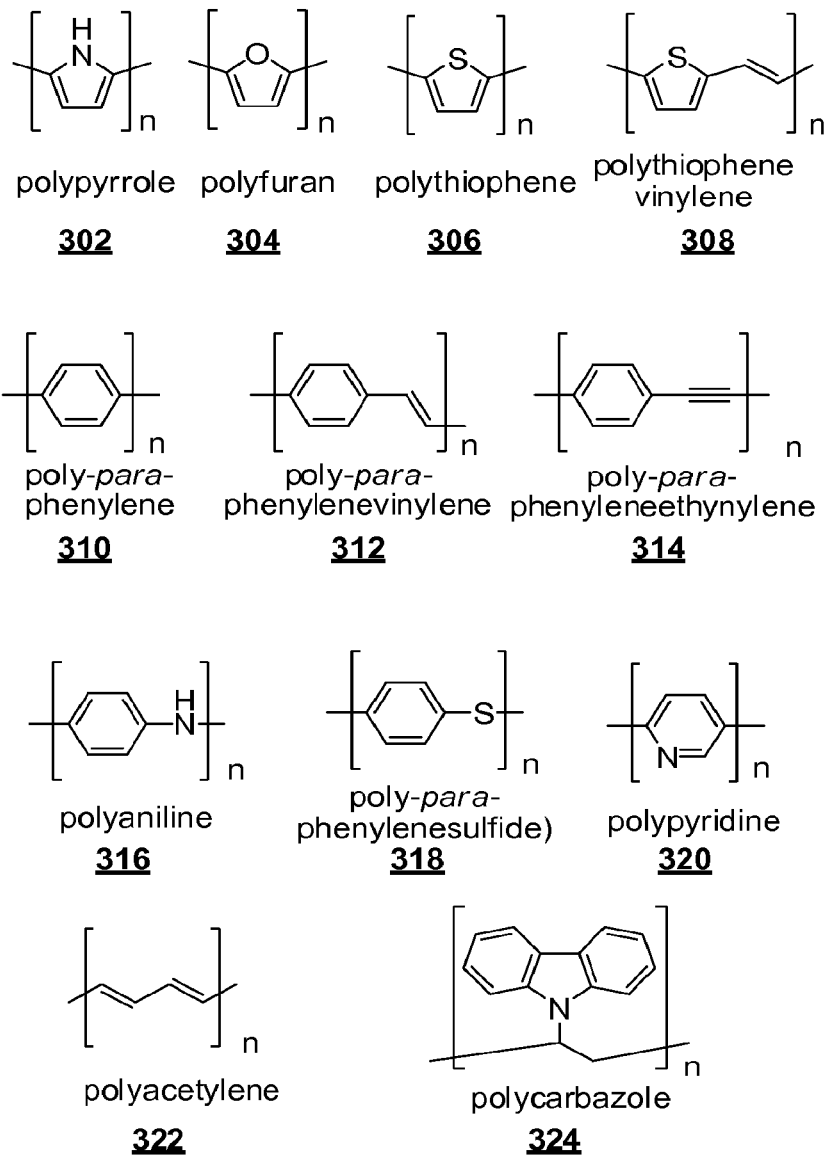
Figure 3B:
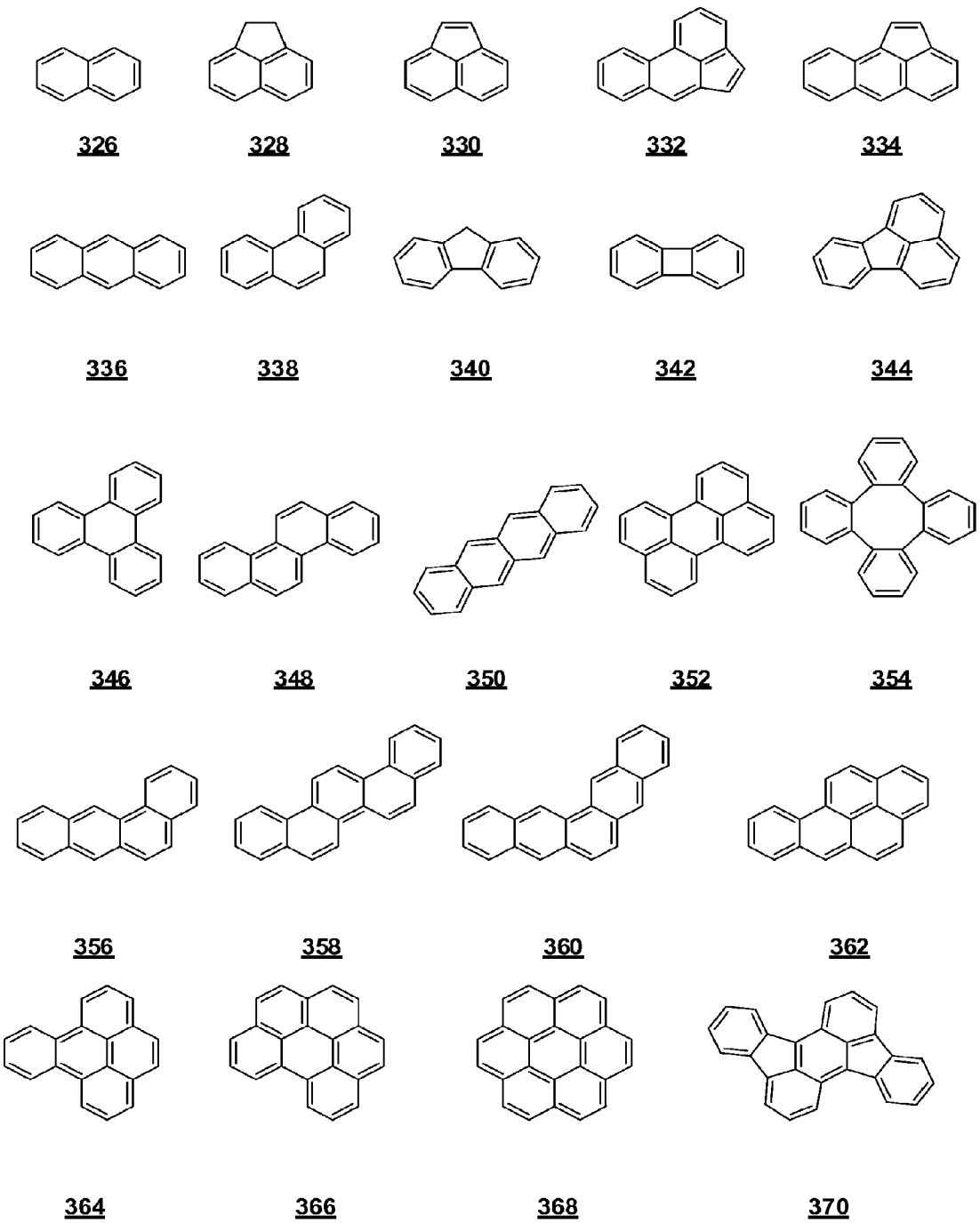
Figure 4A:
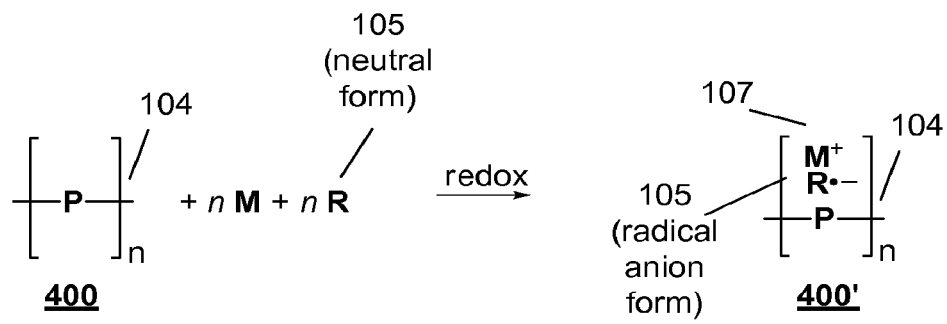
Figure 4A:
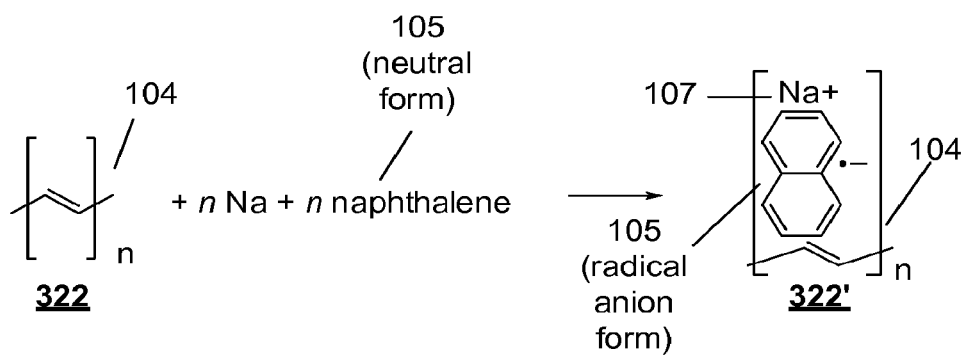
Figure 4A:
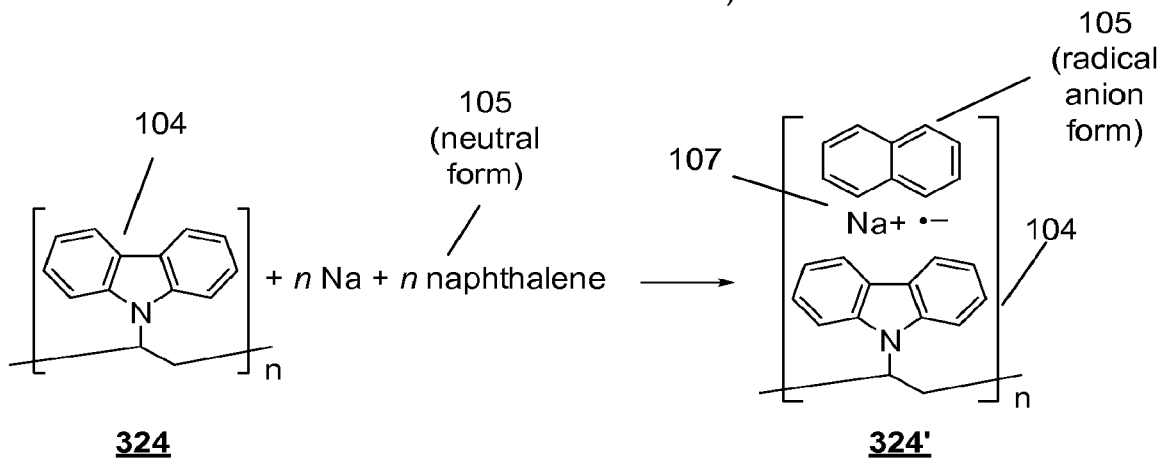
Figure 4B:
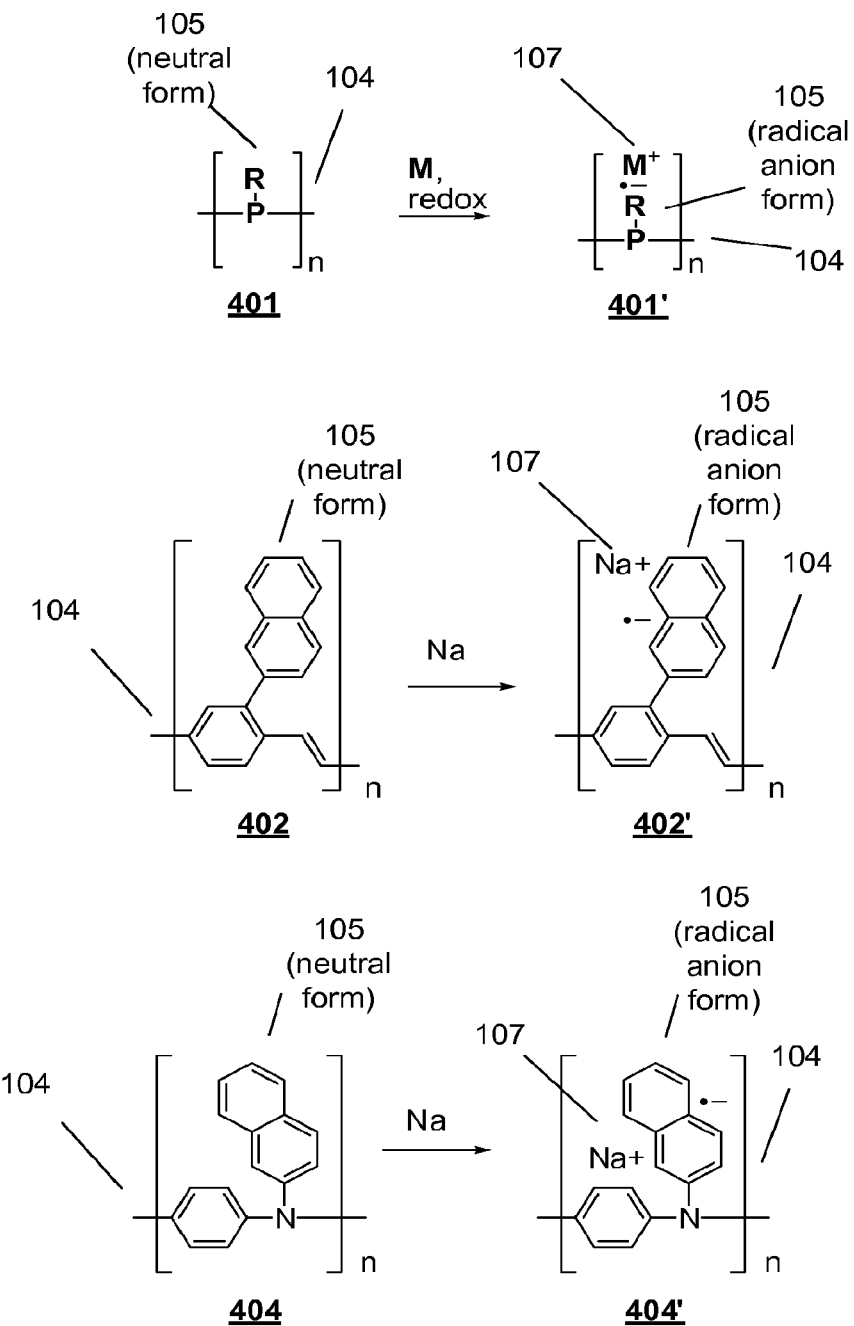
Figure 4C:
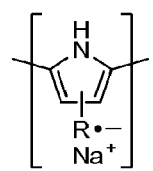
Figure 4C:
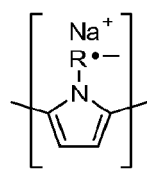
Figure 4C:
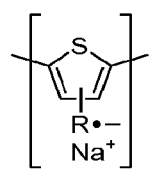
Figure 4C:
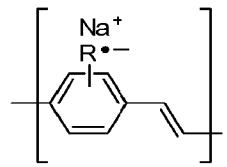
Figure 4C:
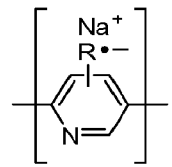
Figure 4C:
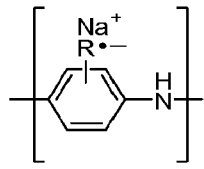
Figure 4C:
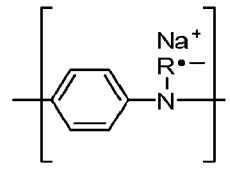
Figure 4D:
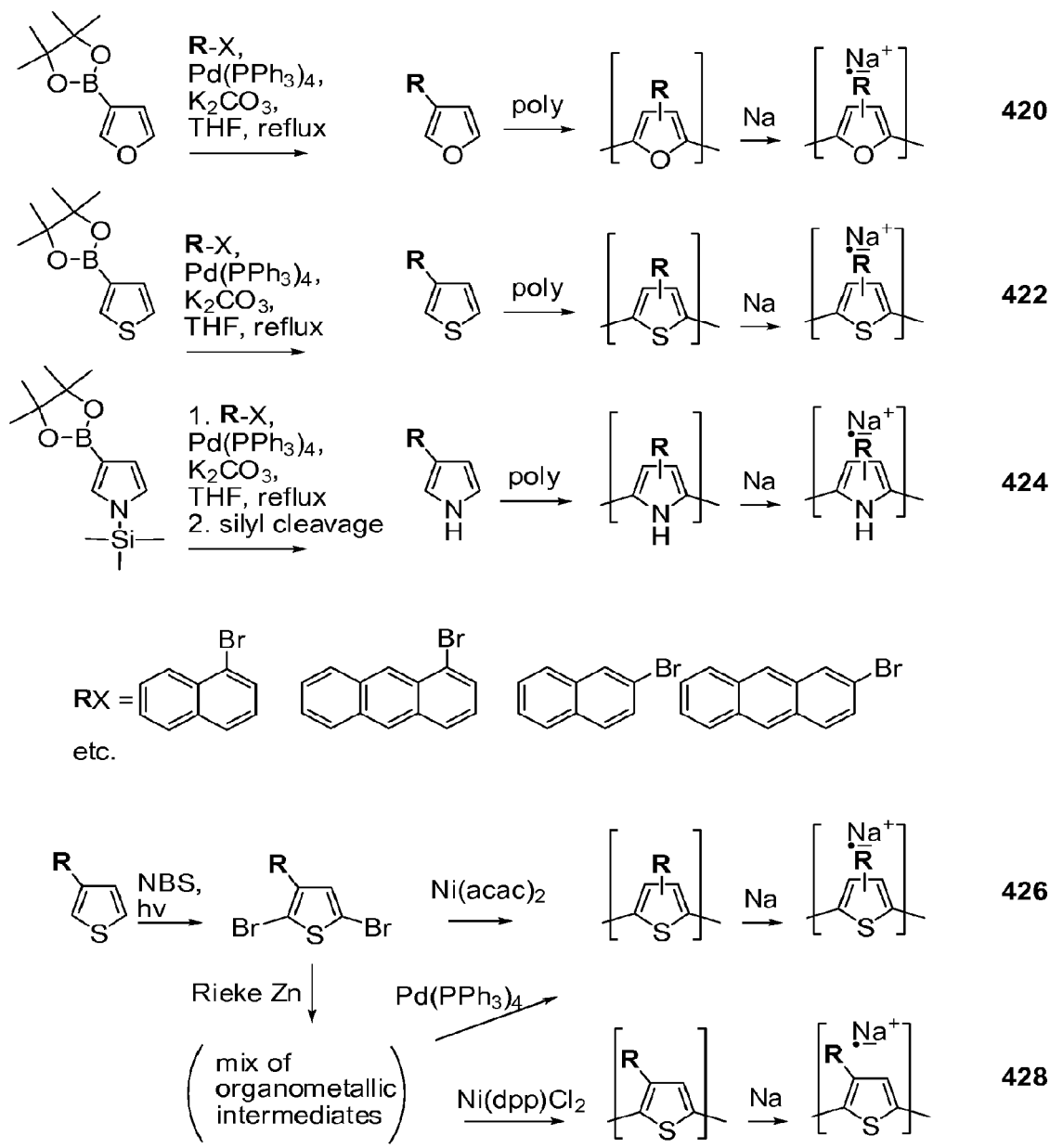
Figure 4E:
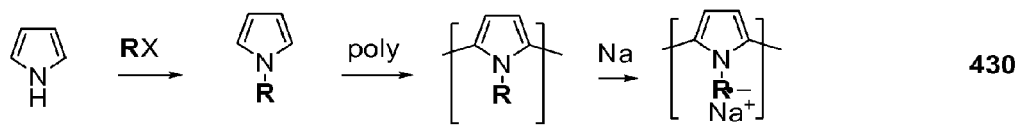
Figure 4E:
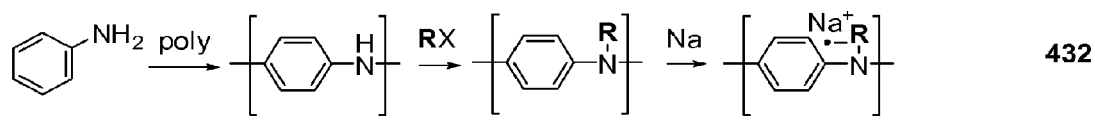
Figure 4E:
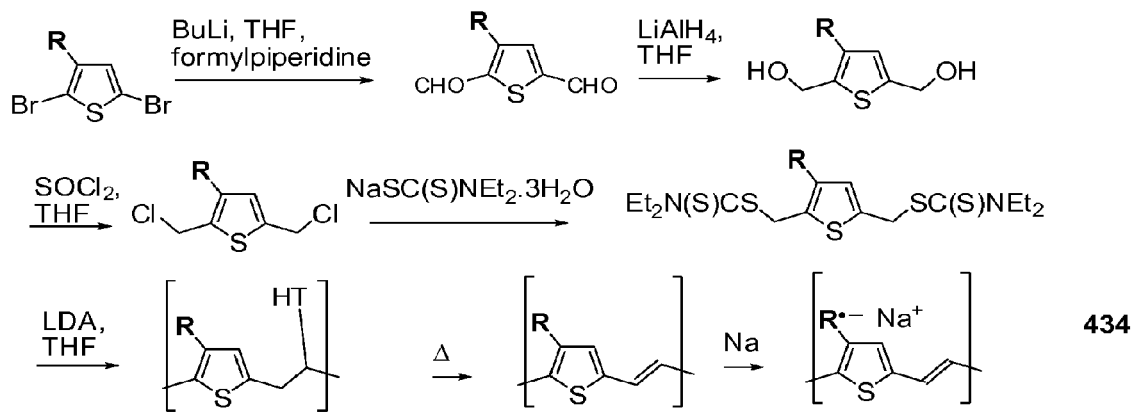
Figure 5:
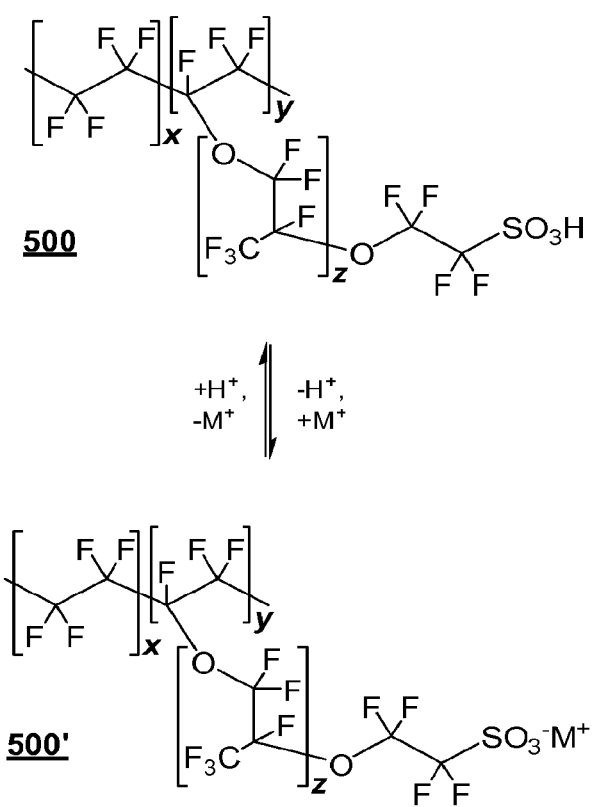
Figure 6:
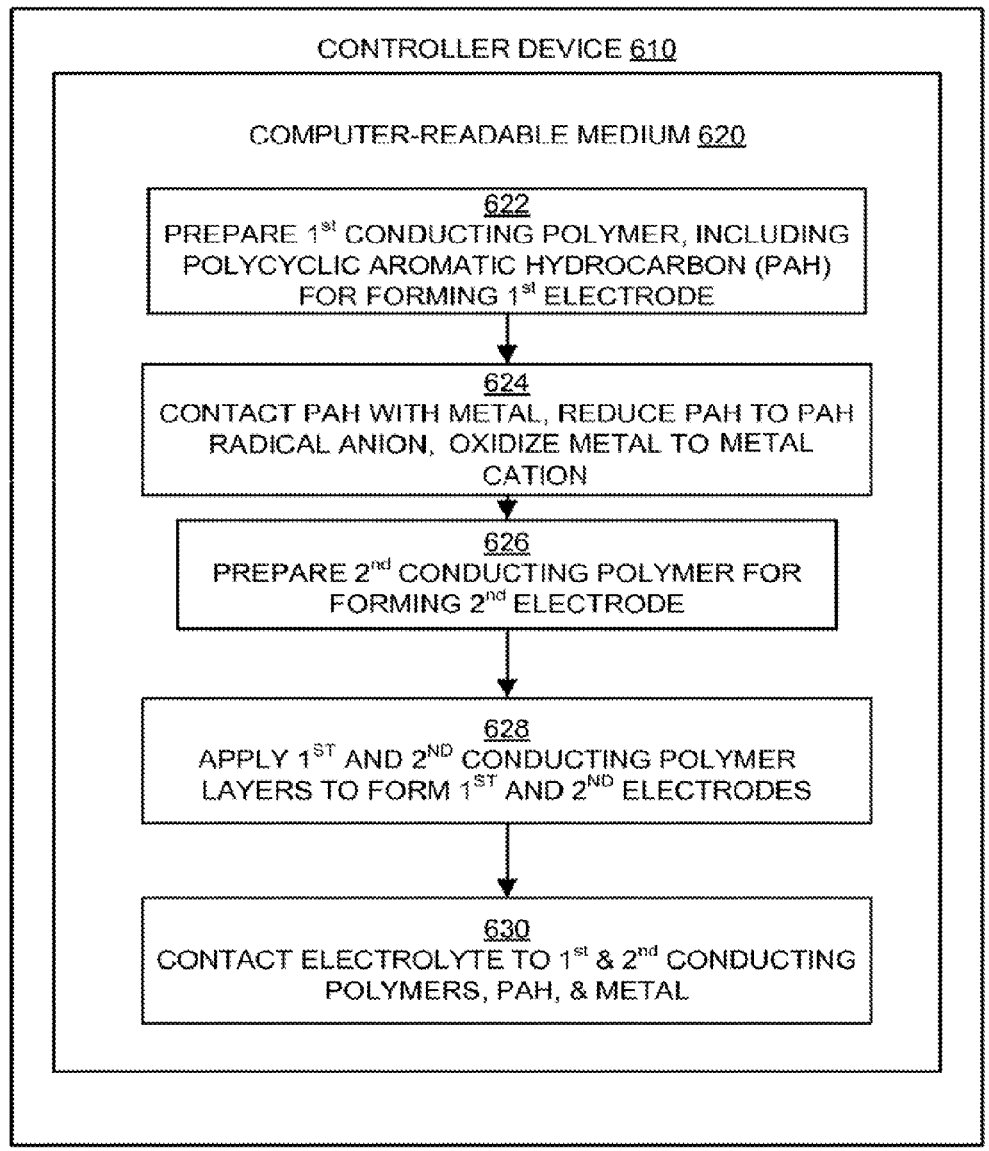
Figure 7:
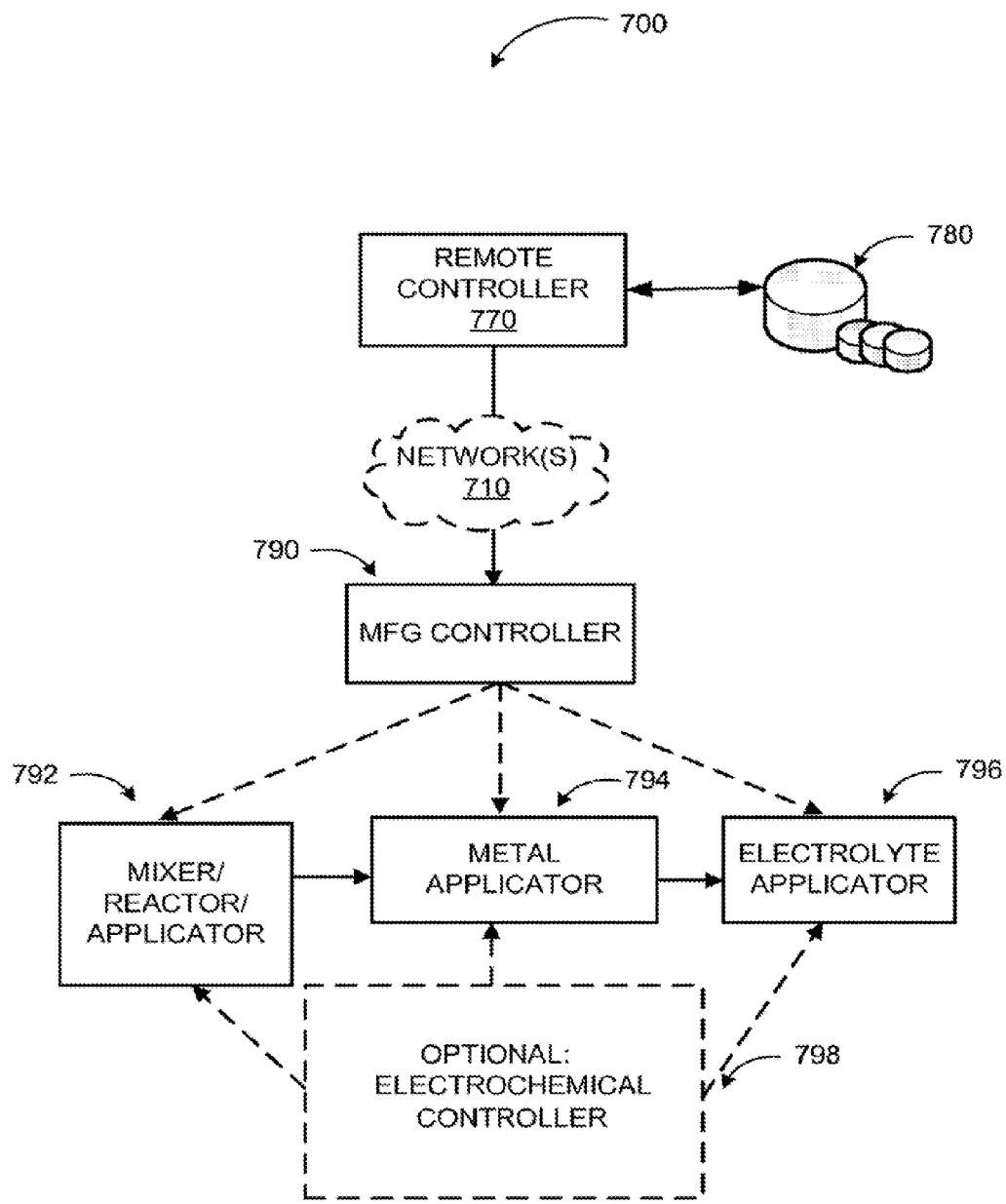
Figure 8:
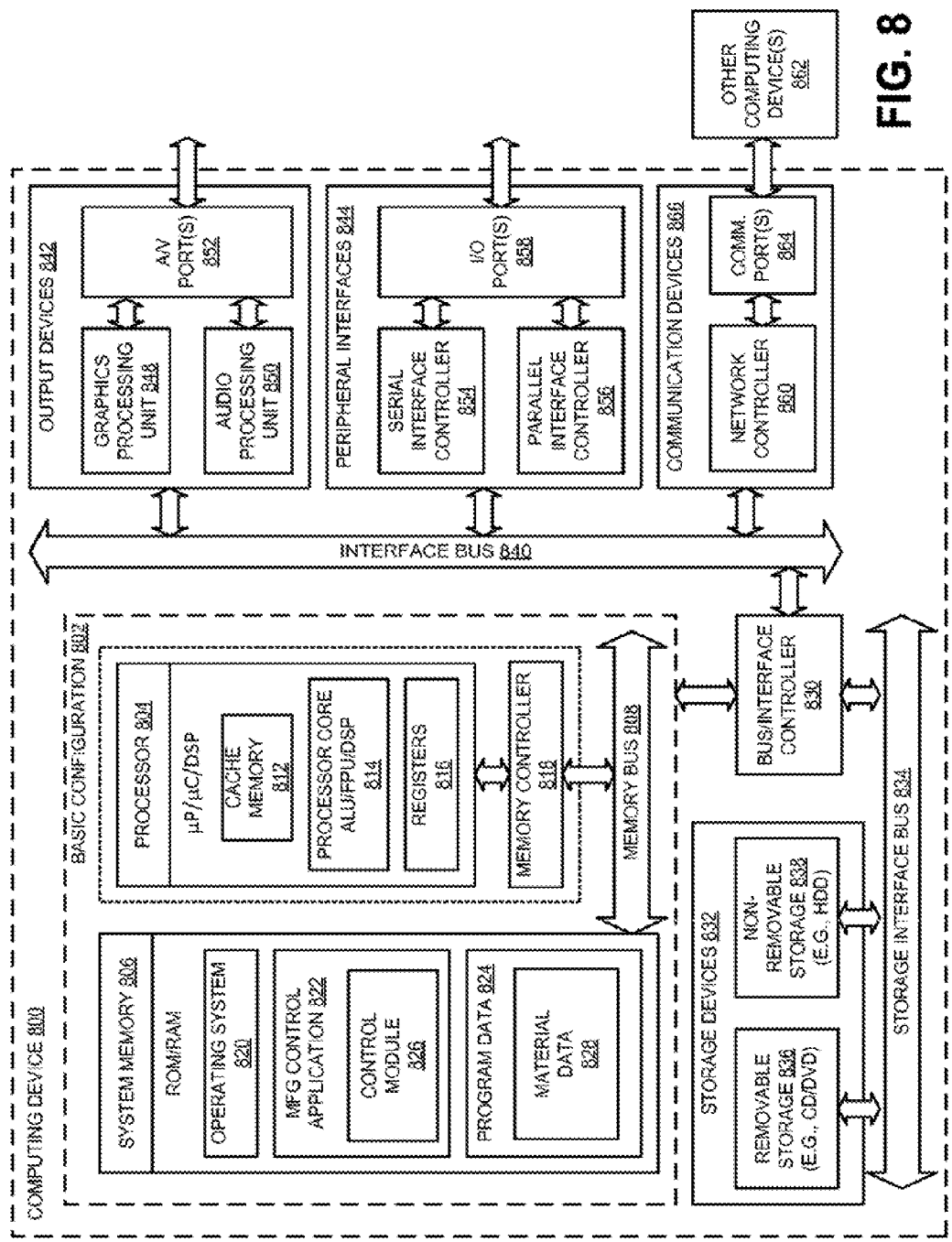
Figure 9:
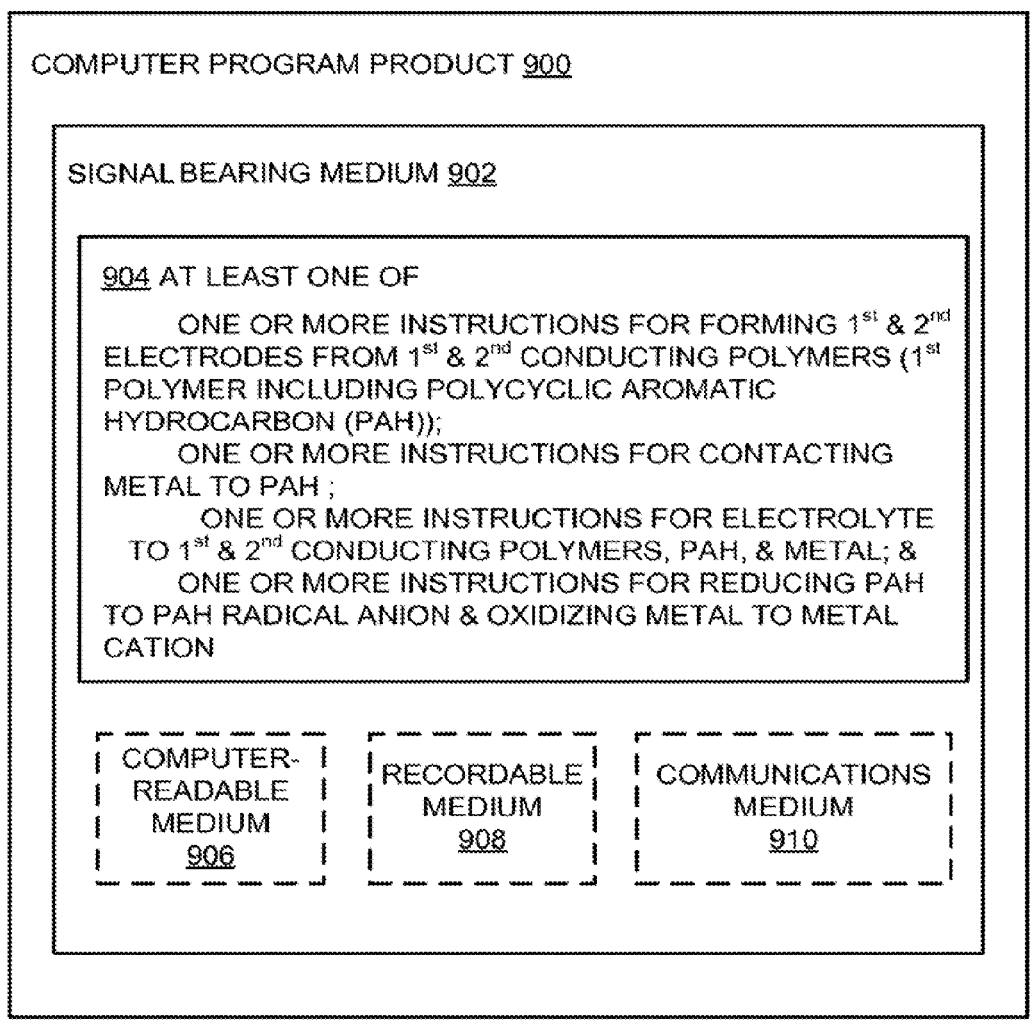

1A, where the two example electrochemical cells may be coupled together in a series configuration;

FIG. 2B is a conceptual drawing of an example battery that may include two example electrochemical cells of FIG. 1B, where the two example electrochemical cells may be coupled together in a parallel configuration;

FIG. 3A shows chemical structures representing example conducting polymers that may be employed in example electrochemical cells and methods;

FIG. 3B shows chemical structures representing example polycyclic aromatic hydrocarbons that may be employed as compounds or substituents in example electrochemical cells and methods;

FIG. 4A shows chemical structures representing example conducting polymers in contact with polycyclic aromatic hydrocarbon compounds, and example conducting polymers in contact with corresponding salts of metal cations and polycyclic aromatic hydrocarbon radical anions;

FIG. 4B shows chemical structures representing example conducting polymers in contact with covalent polycyclic aromatic hydrocarbon substituents, and example conducting polymers in contact with corresponding salts of metal cations and covalent polycyclic aromatic hydrocarbon radical anion substituents;

FIG. 4C shows chemical structures representing example conducting polymers in contact with covalently attached polycyclic aromatic hydrocarbon radical anion substituents;

FIG. 4D and FIG. 4E show example synthetic reaction schemes for preparing polymers with covalently attached polycyclic aromatic hydrocarbon substituents as precursors for the polymers of FIG. 4B and FIG. 4C;

FIG. 5 is a chemical structure representing an example ionomer membrane that may function as a solid electrolyte;

FIG. 6 is a flow diagram showing example steps that may be used in making an example electrochemical cell;

FIG. 7 is a block diagram of an automated machine that may be used for making an example electrochemical cell using the process steps outlined in FIG. 6;

FIG. 8 illustrates a general purpose computing device that may be used to control the automated machine of FIG. 7 or similar manufacturing equipment in making an example electrochemical cell; and FIG. 9 illustrates a block diagram of an example computer program product that may be used to control the automated machine of FIG. 7 or similar manufacturing equipment in making an example electrochemical cell, all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to manufacturing or using electrochemical cells, for example as part of an energy storage device such as a battery.

Briefly stated, an example electrochemical cell may incorporate two types of conducting polymers, each located at a corresponding electrode; a cation; a polycyclic aromatic hydrocarbon radical anion that contacts one of the conducting polymers; and an electrolyte. In some examples, the polycyclic aromatic hydrocarbon radical anion may be a covalent substituent of one of the conducting polymers. In other examples, the polycyclic aromatic hydrocarbon radical anion may be in non-covalent contact with one of the conducting polymers. The polycyclic aromatic hydrocarbon radical anion may permit the use of cations other than lithium, e.g. an alkali metal cation such as sodium or alkali earth metal cation such as calcium. Such an electrochemical cell may provide alternative batteries to existing lithium ion batteries, permitting the use of cations that may be more abundant, more easily extracted, or more sustainable compared to known lithium supplies.

FIG. 1A is a conceptual drawing of an example electrochemical cell 100A that may include a first electrode 102 with a first conducting polymer 104, and a second electrode 108 with a second conducting polymer 106, arranged in accordance with at least some embodiments described herein. Example electrochemical cell 100A also may include at least one polycyclic aromatic hydrocarbon radical anion 105, symbolized by R.−, that may be adapted to contact the first conducting polymer 104. Example electrochemical cell 100A also may include a metal cation 107, symbolized by M+. An electrolyte 110A dispersed in example electrochemical cell 100A may be adapted to conductively couple electrodes 102/108, first and second conducting polymers 104/106, radical anion 105, and metal cation 107.

As used herein, "adapted to contact" includes examples where a species such as polycyclic aromatic hydrocarbon radical anion 105 may be configured as a covalent substituent of another species such as first conducting polymer 104. "Adapted to contact" may also include examples where a species such as polycyclic aromatic hydrocarbon radical anion 105 may contact a species such as first conducting polymer 104 solely through noncovalent interactions. "Noncovalent interactions" may include any contact other than a covalent bond. For example, noncovalent interactions may include, but are not limited to, van der waals interactions, London forces, electrostatic interactions, induced polarization interactions, exchange interactions, magnetic interactions, conductive interactions, electron transfer, or the like. In various examples, two or more species adapted to contact each other through one or more covalent bonds may also contact each other through one or more noncovalent interactions. "Adapted to contact" may also include example electrochemical cells with both covalent and noncovalently contacting species in the same. In various examples, example electrochemical cells may include instances of both covalent and noncovalent contact between species such as polycyclic aromatic hydrocarbon radical anion 105 and species such as first conducting polymer 104.

FIG. 1B is a conceptual drawing of an example electrochemical cell 100B that may include a first electrode 102 with a first conducting polymer 104, and a second electrode 108 with a second conducting polymer 106, arranged in accordance with at least some embodiments described herein. Example electrochemical cell 100B also may include a polycyclic aromatic hydrocarbon radical anion 105, symbolized by R.−; and a metal cation 107, symbolized by M+. Example electrochemical cell 100B may be distinguished from example cell 100A by solid ionomer electrolyte 110B. Solid ionomer electrolyte 110B is shown in the form of a membrane located between conducting polymers 104/106. Solid ionomer electrolyte 110B may be adapted to conductively couple electrodes 102/108, first and second conducting polymers 104/106, radical anion 105, and metal cation 107.

FIG. 2A is a conceptual drawing illustrating an example battery 200A which may include two example electrochemical cells of the same design as cell 100A in FIG. 1A, arranged in accordance with at least some embodiments described herein. In FIG. 2A, the two individual electrochemical cells may be coupled together in a series configuration from electrode 202A, through series electrode 201, and then to electrode 208A.

FIG. 2B is a conceptual drawing illustrating an example battery 200B which may include two example electrochemical cells of the same design as cell 100B in FIG. 1B, arranged in accordance with at least some embodiments described herein. In FIG. 2B, the two individual electrochemical cells may be coupled together in a parallel configuration via parallel electrodes 202B and 208B.

First and second conducting polymers 104 and 106 may be any suitable conducting polymer or mixture of conducting polymers. As used herein, a conducting polymer may be an organic polymer that conducts electricity, or that may be oxidatively or reductively doped to conduct electricity. A conducting polymer may be a homopolymer or a copolymer such as a block copolymer, a random copolymer, or a graft copolymer.

FIG. 3A shows chemical structures representing conducting polymers that may be employed in example electrochemical cells and methods, arranged in accordance with at least some embodiments described herein. Example conducting polymers may include, but are not limited to, polypyrrole 302, polyfuran 304, polythiophene 306, polythiophene vinylene 308, poly-para-phenylene 310, poly-para-phenylenevinylene 312, poly-para-phenylene ethynylene 314, polyaniline 316, poly-para-phenylene sulfide 318, polypyridine 320, polyacetylene 322, and polycarbazole 324. Examples of homopolymers may include polypyrrole 302, polyfuran 304, polythiophene 306, poly-para-phenylene 310, polyaniline 316, poly-para-phenylene sulfide 318, polypyridine 320, polyacetylene 322, and polycarbazole 324. Examples of copolymers include block copolymers that may include alternating blocks of one or more repeat units of homopolymers. For example, block copolymers with alternating blocks of single repeat units may include polythiophene vinylene 308 (alternating repeat units of thiophene and polyacetylene), poly-para-phenylenevinylene 312 (alternating repeat units of para-phenylene and polyacetylene), or the like.

In various examples, the first conducting polymer may include a polyacetylene (e.g., polyacetylene 322), a polyarylene (e.g., poly-para-phenylene 310), a polyheteroarylene (e.g., polypyrrole 302, polypyridine 320, or the like), a polyvinylarylene (e.g., poly-para-phenylenevinylene 312), a polyvinylheteroarylene (e.g., polythiophene vinylene 308), a polyarylene ethynylene (e.g., poly-para-phenylene ethynylene 314), a polyheteroarylene ethynylene (e.g. polypyridine ethynylene), or a combination or copolymer thereof. In some examples, the first conducting polymer may include a polyacetylene, a poly(phenylene vinylene), a poly(fluorene), a polypyrene, a polyazulene, a polynaphthalene, a poly(pyrrole), a polyindole, a polyazepine, a polyaniline, a polypyridine, a poly(thiophene), a poly(thiophene vinylene), a poly(phenylene sulfide), or a combination or copolymer thereof.

In various examples, the second conducting polymer may include a hydrocarbon conducting polymer. In some examples, the second conducting polymer may include a polyacetylene, a polyarylene, a polyarylene vinylene, a polyarylene ethynylene, or a combination or copolymer thereof. In various examples, the second conducting polymer may include poly-para-phenylene, poly-para-phenylene vinylene, poly-para-phenylene ethynylene, polyacetylene, or a combination or copolymer thereof.

As used herein, a polycyclic aromatic hydrocarbon may be a compound of carbon and hydrogen that comprises two or more aromatic rings. FIG. 3B shows chemical structures of exemplary polycyclic aromatic hydrocarbons suitable for polycyclic aromatic hydrocarbon radical anion 105. Example polycyclic aromatic hydrocarbons may include, but are not limited to those shown in FIG. 3B, e.g., naphthalene 326, acenapthalene 328, acenaphthylene 330, acephenanthrylene 332, aceanthrylene 334, anthracene 336, phenanthrene 338, fluorene 340, biphenylene 342, fluoranthene 344, triphenylene 346, chrysene 348, tetracene 350, perylene 352, tetraphenylene 354, tetraphene 356, picene 358, pentaphene 360, benzo[a]pyrene 362, benzo[e]pyrene 364, benzo[ghi]perylene 366, coronene 368, and rubicene 370. Such polycyclic aromatic hydrocarbons may be commercially available, as may be various substituted derivatives thereof. In various examples, the polycyclic aromatic hydrocarbon radical anion may be naphthalene radical anion or anthracene radical anion.

The polycyclic aromatic hydrocarbon radical anion 105 may be converted to its radical anion state by electrochemical or chemical reduction of the corresponding polycyclic aromatic hydrocarbon. For example, sodium naphthalene, the sodium salt of naphthalene radical anion, may be prepared by stirring an anhydrous tetrahydrofuran solution of naphthalene with metallic sodium. Likewise, the potassium salt of anthracene radical anion may be prepared by stirring an anhydrous tetrahydrofuran solution of anthracene with metallic potassium. Some polycyclic aromatic hydrocarbons may be commercially available in their radical anion state, such as sodium naphthalene.

Cation 107 may be any mobile cation suitable for ionic interaction with polycyclic aromatic hydrocarbon radical anion 105, such as an alkali metal cation, an alkaline earth metal cation, or a mixture thereof. In various examples, suitable alkali metals for cations may include lithium, sodium, potassium, rubidium, caesium, or francium. In various examples, suitable alkali earth metals for cations may include beryllium, magnesium, calcium, strontium, barium and radium. In some examples, cation 107 may include the cations of sodium, potassium, rubidium, caesium, magnesium, calcium, and barium. In various examples, cation 107 may include the cations of sodium, potassium and calcium. In some examples, cation 107 may be sodium cation, $Na^+$.

In various examples, polycyclic aromatic hydrocarbon radical anion 105 may be in noncovalent contact with first conducting polymer 104. FIG. 4A shows some example first conducting polymers 104 in contact with neutral polycyclic aromatic hydrocarbons. FIG. 4A also shows some example first conducting polymers in contact with corresponding salts of metal cations and polycyclic aromatic hydrocarbon radical anions.

For example, generic structure 400 shows a first conducting polymer 104 including a repeat unit symbolized by P. Generic structure 400 may be contacted with non-covalently bonded polycyclic aromatic hydrocarbon 105 in its neutral form, symbolized by R. Generic structure 400 may also be contacted with metal M. Generic structure 400 may also be subjected to chemical or electrochemical redox conditions, which may reduce R to R.− and/or oxidize M to M+, leading to polymer 400'. Polymer 400' may be in non-covalent contact with polycyclic aromatic hydrocarbon radical anion 105, symbolized by R.−. Polymer 400' may also include metal cation 107, symbolized by M+.

In another example illustrated in FIG. 4A, a sample of polyacetylene 322 may be combined in anhydrous tetrahydrofuran with naphthalene and metallic sodium. The naphthalene and metallic sodium may react to form the sodium salt of naphthalene radical anion. The tetrahydrofuran solvent may be removed to leave complex 322', which may include polyacetylene doped with the sodium salt of naphthalene radical anion.

In a further example illustrated in FIG. 4A, polyvinylcarbazole 324 may be combined in anhydrous tetrahydrofuran with naphthalene and metallic sodium to result in complex 324', which may include polyvinylcarbazole doped with the sodium salt of naphthalene radical anion.

In various examples, the first conducting polymer may be covalently substituted by the polycyclic aromatic hydrocarbon radical anion. FIG. 4B shows some example conducting polymers that have covalent polycyclic aromatic hydrocarbon substituents. FIG. 4B also shows example conducting polymers in contact with corresponding salts of metal cations and covalent polycyclic aromatic hydrocarbon radical anion substituents.

For example, generic structure 401 shows a first conducting polymer 104 with a repeat unit symbolized by P and a covalently bonded polycyclic aromatic hydrocarbon 105 in its neutral form, symbolized by R. Generic structure 401 may be contacted with metal M under chemical or electrochemical redox conditions, leading to polymer 401'. Polymer 401' may include covalently bonded polycyclic aromatic hydrocarbon radical anion 105, symbolized by R.−. Polymer 401' may also include metal cation 107, symbolized by M+.

In another example illustrated in FIG. 4B, naphthalene-substituted poly-para-phenylene 402 may be dissolved in a suitable solvent, e.g., tetrahydrofuran, and reacted with a suitable metal, e.g., sodium. Removal of the solvent leaves polymer 402', which may include naphthalene radical anion 105 as a substituent of first polymer 104, along with Na+ cation 107.

In a further example illustrated in FIG. 4B, N-naphthyl polyaniline 404 may be dissolved in a suitable solvent, e.g., tetrahydrofuran, and reacted with a suitable metal, e.g., sodium. Removal of the solvent leaves doped complex 404', which may include naphthalene radical anion 105 as a substituent of first polymer 104, along with Na+ cation 107.

FIG. 4C shows the sodium salts of some example first conducting polymers in contact with covalently attached polycyclic aromatic hydrocarbon radical anion substituents. For example, polycyclic aromatic hydrocarbon radical anion substituents are shown C-substituted at polypyrrole derivative 406, polythiophene derivative 410, poly-para-phenylene derivative 412, polypyridine derivative 414, and polyaniline derivative 416. Also, polycyclic aromatic hydrocarbon radical anion substituents are shown N-substituted at polypyrrole derivative 408 and polyaniline derivative 418. In other examples, suitable first conducting polymers may include combinations or copolymers of the conducting polymers illustrated in FIG. 4C.

FIG. 4D and FIG. 4E show some example synthetic procedures for preparing polymers with covalently attached polycyclic aromatic hydrocarbon substituents. FIG. 4D and FIG. 4E also show subsequent reactions which may be employed to form covalently attached polycyclic aromatic hydrocarbon radical anion substituents, arranged in accordance with at least some embodiments described herein. See also Examples 7-13 below for detailed demonstrations of various example synthetic procedures.

For example, monomers for polymerization to conducting polymers may be first substituted with polycyclic aromatic hydrocarbons, and then polymerized according to known chemical or electrochemical polymerization methods. In various examples, polycyclic aromatic hydrocarbons may be coupled to aryl or heteroaryl monomers of conducting polymers via tetrakis-triphenyl phosphine palladium catalyzed cross-coupling of corresponding bromo and boronate-ester substituted precursors using the well known Suzuki coupling reaction (Reaction Schemes 420, 422, and 424). See Examples 7, 8 and 9 for further details and specific demonstrations.

Many thiophenes, furans, and pyrroles may be polymerized to their corresponding conducting polymers using standard electrochemical methods. In some instances, electrochemical polymerization of some 3-substituted thiophenes, furans, and pyrroles has been reportedly hindered due to steric effects. Fortunately, many known chemical methods may provide effective regio-random and regio-regular polymerization of 3-substituted thiophenes, furans, and pyrroles. Examples adapted from known chemical methods are shown in Reaction Schemes 426 and 428. For example, irradiation of 3-substituted thiophenes in the presence of two equivalents of N-bromo-succinimide may produce 2,5-dibromo-3-substituted thiophenes. These 2,5-dibromo-3-substituted thiophenes may be polymerized directly using nickel acetoacetate as a catalyst, which may form corresponding regio-random polymers. In other examples, 2,5-dibromo-3-substituted thiophenes may be treated with so-called "Rieke zinc" to form a mixture of organometallic isomers. Regio-random polymerization of the mix of organometallic isomers may be accomplished using a catalytic amount of tetrakis-triphenyl phosphine palladium. Regio-regular polymerization of the mix of organometallic isomers may be accomplished using a catalytic amount of 1,2-bis (diphenylphosphino)ethane nickel(II) chloride. See Example 10 for further details and a specific demonstration.

In other examples, FIG. 4E, Reaction Scheme 430 shows that monomers with primary or secondary amines such as pyrrole may be N-substituted using a halo polycyclic aromatic hydrocarbon. The N-substituted monomers may be polymerized to the corresponding N-substituted polymer via electrochemical or chemical polymerization. See Example 11 for further details and a specific demonstration. In further examples, FIG. 4E, Reaction Scheme 432 shows that polymers with primary or secondary amines such as polyaniline may be N-substituted using a halo polycyclic aromatic hydrocarbon. See Example 12 for further details and a specific demonstration.

In another example, substituted poly arylene vinylene or heteroarylene vinylenes may be synthesized from the R-substituted aryl or heteroaryl precursor by various known routes. An example procedure adapted from known routes is shown in Reaction Scheme 434 in FIG. 4E. A 3-substituted 2,5 dibromo thiophene (obtained as shown in Reaction Scheme 426) may be converted to the 2,5-diformyl compound by reaction with butyllithium followed by formylpiperidine. The 2,5-diformyl compound may be reduced using lithium aluminum hydride to give the 2,5-dimethanol compound. The 2,5-dimethanol derivative may be converted to the corresponding 2,5-dichloromethyl compound with thionyl chloride. The 2,5-dichloromethyl compound may be reacted with sodium diethyldithiocarbamato trihydrate to form the corresponding 2,5-bis diethyldithiocarbamato derivative. The 2,5- bis diethyldithiocarbamato derivative may be polymerized in a regio-specific manner with lithium isopropyl amide to form an initial polymer with a diethyldithiocarbamato substituent. Subsequent thermolysis of the initial polymer generates, for example, substituted thiophene vinylene. See Example 13 for further details and a specific demonstration.

In each of Reaction Schemes 420, 422, 424, 426, 428, 430, 432 and 434, the last step may include chemical or electrochemical reduction in the presence of the metal cation precursor, e.g., reaction with sodium metal produces the salt of the metal cation Na+ and the covalently bound polycyclic aromatic hydrocarbon radical anion R.−.

Suitable starting materials for reactions described in FIG. 4D and FIG. 4E may include halo or borate/boronic ester substituted derivatives of polycyclic aromatic hydrocarbons and of conducting polymer monomers. Halogen derivatives of polycyclic aromatic hydrocarbons and of conducting polymer monomers may also be synthesized by irradiating a mixture of the unsubstituted polycyclic aromatic hydrocarbon in the presence of a halogen radical source, e.g., N-bromo-succinimide or N-chloro-succinimide. Boronate ester substituted derivatives may also be synthesized by reaction of the corresponding halo derivative with pinacol borane in the presence of palladium dichloride.

In various examples, e.g., as illustrated in FIG. 1A, electrolyte 110A may include a liquid electrolyte. In some examples, the electrolyte may include a polyoxyalkylene, a polyoxyalkylene alcohol, an alkyl ether, a cycloalkyl ether, an alkylene carbonate, a cycloalkylene carbonate, an alkanone, a cycloalkanone, a lactone, or a combination thereof. Suitable polyoxyalkylene or polyoxyalkylene alcohols may include, e.g., polyethylene oxide or polyethylene glycol. Suitable alkyl ethers may include, e.g., diethyl ether, diisopropyl ether, and the like. Suitable cycloalkyl ethers may include, for example, tetrahydrofuran, dioxane, or the like. Suitable alkylene or cycloalkylene carbonates may include ethylene carbonate, propylene carbonate, or the like. Suitable alkanones or cycloalkanones may include, e.g., acetone, methyl ethyl ketone, cyclopentanone, cyclohexanone, or the like. Suitable lactones may include beta-propiolactone, gamma-butyrolactone, delta-valerolactone, or the like.

In various examples, the electrolyte may include one or more electrolyte salts. Suitable electrolyte salts may include the metal cation 107, other cations, such as ammonium, tetraalkylammonium, phosphonium, or tetralkylphosphonium, a combination thereof, or the like. In some examples, the electrolyte salts may include the metal cation 107. Suitable electrolyte salts may include anions such as fluoride, chloride, bromide, iodide, carboxylates, trifluoromethanesulfonate, bistrifluoromethanesulfonimidate, fluorosulfate, hexafluorophosphate, perchlorate, tetrafluoroborate, p-toluenesulfonate, nitrate, or the like. Suitable carboxylates may include, e.g., acetate, benzoate, or the like. In some examples, the electrolyte salt may include perchlorate or trifluoromethansulfonate anions.

In some examples, the electrolyte may include a salt of an ionomer that separates the first conducting polymer from the second conducting polymer, for example, the ionomer electrolyte 110B depicted in FIG. 1B. As used herein, an ionomer may be a polymer that may include both electrically neutral repeat units and ionizable repeat units. Suitable neutral repeat units may include alkyl, alkyl ether, perfluoroalkyl, and perfluoroalkyl ether units. Suitable ionizable repeat units may include sulfonates, phosphates, and carboxylates. Many suitable ionomers are commercially available and may be commonly employed as proton exchange membranes. In various examples, suitable ionomers may include the class of poly-tetrafluoroethylene:perfluorosulfonic acid copolymers known by the trade name NAFION® (Dupont, Wilmington, Del.). These ionomers may be characterized by a polytetrafluoroethylene backbone substituted with perfluorovinyl ether groups having a terminal sulfonate. FIG. 5 shows a chemical structure representing one specific example ionomer membrane that may function as a solid electrolyte, namely, tetrafluoroethylene-perfluoro-3,6-dioxa-4-methyl-7-octenesulfonic acid copolymer (CAS Reg. No. 66796-30-3, "NAFION®-H").

First and second electrodes 102 and 108 may be made from any suitable conducting material such as metals or alloys thereof, conducting polymers, conducting oxides, or the like. In some examples, first and second electrodes 102 and 108 may include metals or alloys that may include one or more metals such as copper, aluminum, tin, lead, iron, chromium, cobalt, nickel, silver, gold, platinum, palladium, vanadium, manganese, titanium, tungsten, indium, zinc, cadmium, or the like. In some examples, first and second electrodes 102 and 108 may be in the form of a sheet, wire, plate, foil, tape, or the like. In some examples, first and second electrodes 102 and 108 may include any of the conducting polymers described above for conducting polymers 104 and 106. In some examples, first or second electrodes 102 and 108 may be coincident with the corresponding first or second conducting polymers 104 or 106. For example, first electrode 102 may also be first conducting polymer 104. In some examples, first and second electrodes 102 and 108 may include conducting oxides such as indium tin oxide, aluminum doped zinc oxide, indium doped cadmium oxide, or the like.

The charges and number of species, for example, R.− for polycyclic aromatic hydrocarbon radical anion 105 and $M^+$ for metal cation 107 in FIG. 1A and FIG. 1B, are shown for the purpose of illustrating the concept and are not intended to be limiting. For example, the metal cation may be a divalent cation such as $Ca^{++}$, $Ba^{++}$, $Mg^{++}$, or the like. Likewise, the locations of radicals and positive or negative charges are shown for the purpose of illustrating the concept and are not intended to be limiting.

Furthermore, depending on the electrochemical state of electrochemical cell 100A or 100B at any given time, some portion of the species illustrated as charged may exist in a neutral form. For example, some portion of the polycyclic aromatic hydrocarbon radical anion 105 may be in the form of the corresponding neutral polycyclic aromatic hydrocarbon, e.g., naphthalene radical anion versus its neutral form, naphthalene. In another example, some portion of the metal cation 107 may be in its neutral form, e.g., sodium cation versus neutral sodium metal.

Example embodiments may also include methods of making an electrochemical cell or battery as described herein. These methods may be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. The various human operators need not be collocated with each other, and instead each operated can be located about one or more machines that perform a portion of the operations. In other examples, the human interaction may be automated such as by pre-selected criteria that may be machine automated.

FIG. 6 is a flow diagram showing steps that may be used in making an example electrochemical cell, such as electrochemical cells 100A or 100B, or corresponding batteries such as battery 200A or battery 200B, arranged in accordance with at least some embodiments described herein.

In various examples, a method of making an electrochemical cell such as cell 100A may include a step of forming a first electrode 102 including a first conducting polymer 104 and also including a polycyclic aromatic hydrocarbon 105. Polycyclic aromatic hydrocarbon 105 may be in its neutral form. The method of making an electrochemical cell such as cell 100A may also include forming a second electrode 108 that may include a second conducting polymer 106. The method of making an electrochemical cell such as cell 100A may also include contacting polycyclic aromatic hydrocarbon 105 with metal, i.e., the metal corresponding to metal cation 107. For example, if the metal cation 107 is to be $Na^+$ polycyclic aromatic hydrocarbon 105 may be contacted with sodium metal. The method of making an electrochemical cell such as cell 100A may also include contacting an electrolyte 110A to first and second conducting polymers 104 and 106, polycyclic aromatic hydrocarbon 105, and metal cation 107. The electrolyte may include one or more components as described herein above, for example, in some embodiments the electrolyte may include propylene carbonate and sodium perchlorate. The method of making an electrochemical cell such as cell 100A may also include reducing polycyclic aromatic hydrocarbon 105 to its polycyclic aromatic hydrocarbon radical anion form, and oxidizing the metal to its metal cation form 107. For example, if the polycyclic aromatic hydrocarbon 105 is naphthalene and may be contacted with sodium metal as described above, the sodium metal may react chemically with the naphthalene, forming a salt that may include naphthalene radical anion and sodium cation. A method of making an electrochemical cell such as cell 100B may combine one or more of the preceding steps with a step of contacting an electrolyte 110B to first and second conducting polymers 104 and 106, polycyclic aromatic hydrocarbon 105, and metal cation 107. In various examples as described herein above, electrolyte 110B may include an ionomer that contacts first and second conducting polymers 104 and 106, e.g., where the ionomer may be in the form of a membrane.

Suitable polymer processing methods for forming the conducting polymers 104 and 106, and ionomer electrolyte 110B may include various methods already known for forming such polymers. Example methods may include one or more techniques such as: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; adding a preformed polymer layer or membrane, such as a commercially available ionomer proton exchange membrane for ionomer electrolyte 110B, or the like. Specific details of suitable polymer processing conditions may be selected based on the particular conducting polymer or ionomer. For example, typical solution casting methods employ high boiling solvents of the polymer in question.

One additional consideration for making the conducting polymers may include various mixing techniques for dispersing the other described components, such as the polycyclic aromatic hydrocarbon 105, the metal precursor to metal cation 107, and mobile electrolyte components as described above for electrolyte 110A. Such components may be dispersed in a solution or liquid of the polymer or a polymer precursor. The dispersal methods may include mechanical techniques, for example, stirring or mechanical ball milling the components to be dispersed in combination with the polymer. The dispersal methods may also include, for example, ultrasonication of the components in contact with the polymers. In various examples, the dispersal method (e.g., ultrasonication) may be followed immediately by the polymer forming method (e.g., spin coating) to avoid settling of the dispersed components.

Referring again now to FIG. 6, an example method of making an electrochemical cell as described herein may be controlled by a computing device such as device 800 in FIG. 8 or a special purpose controller such as manufacturing controller 790 of FIG. 7. Controller device 610 may be embodied as computing device 800, manufacturing controller 790, or similar devices configured to execute instructions stored in computer-readable medium 620 for controlling the performance of the method. A process of making an electrochemical cell as described herein may include one or more operations, functions or actions as is illustrated by one or more of blocks 622, 624, 626, 628 and/or 630.

Some example processes may begin with operation 622, "PREPARE 1ST CONDUCTING POLYMER, INCLUDING POLYCYCLIC AROMATIC HYDROCARBON (PAH) FOR FORMING 1ST ELECTRODE". Operation 622 may be performed, for example, by mixer/reactor/applicator machine 792 of FIG. 7. Machine 792 may include one or more mixing functions, such as mechanical stirring, ultrasonication for dissolving and/or reacting the conducting polymer 104 as described above. Machine 792 may include one or more application functions, e.g., for applying the solutions of polymers 104 and 106 to form a thin film, or the like. At operation 622, manufacturing controller 790 may instruct machine 792 with parameters regarding, for example, the extent of mechanical stirring or ultrasonication by elapsed time for conducting polymer 104 being mixed and formed. Operation 622 may be continued until a predetermined condition may be satisfied. A "predetermined condition" may include, e.g., a mixing time sufficient to dissolve at least a portion of the polymer 104; a viscosity corresponding to dissolution of at least a portion of the polymer 104; a visual or spectroscopic indicator corresponding to dissolution of at least a portion of the polymer 104, such as refractive index or turbidity; or the like.

In some examples, Operation 622 may be conducted in conjunction with polymerization. For example, the one or more mixing functions of Machine 792 may be employed for dissolving and/or reacting monomeric precursors of conducting polymer 104 or 106. Machine 792 may include one or more application functions, e.g., for contacting monomeric precursors of conducting polymer 104 or 106 to first or second electrodes 102 or 108. Also, optional electrochemical controller 798 may be operated to electrochemically polymerize monomeric precursors of conducting polymer 104 or 106 at first or second electrodes 102 or 108.

Operation 622 may be followed by operation 624, "CONTACT PAH WITH METAL, REDUCE PAH TO PAH RADICAL ANION, and OXIDIZE METAL TO METAL CATION". At operation 624, manufacturing controller 790 may instruct machine metal applicator machine 794, optionally in conjunction with machine 792 operating in mixing/reactor mode with parameters. Instructions in operation 624 may regard, for example, the extent of mechanical stirring or ultrasonication by elapsed time for reacting polycyclic aromatic hydrocarbon 105 with the metal. Instructions in operation 624 may also regard, for example, aspects of mixing polycyclic aromatic hydrocarbon 105 and the metal cation 107 with conducting polymer 104. Operation 624 may be continued until a predetermined condition may be reached, e.g., the mixing has proceeded for a sufficient length of time to react and mix polycyclic aromatic hydrocarbon 105, metal cation 107 and conducting polymer 104. Operation 624 may be performed with chemical reaction of the metal with the polycyclic aromatic hydrocarbon 105 as described herein, or operation 624 may be performed with electrochemical control of the reaction using optional electrochemical controller 798.

Similar to operation 622, in operation 626, "PREPARE 2nd CONDUCTING POLYMER FOR FORMING 2nd ELECTRODE", manufacturing controller 790 may instruct machine 792 with parameters regarding, for example, the extent of mechanical stirring or ultrasonication by elapsed time for conducting polymer 106 being mixed and formed. Operation 626 may be continued until a predetermined condition may be reached, e.g., the mixing has proceeded for a sufficient length of time to dissolve polymer 106.

In various examples, mixing of polymers 104 and 106, polycyclic aromatic hydrocarbon 105, and metal cation 107 may include ultrasonication between about 5 minutes and about 12 hours. In some examples, suitable ultrasonication times range from about 15 minutes to about 8 hours, between about 30 minutes to about 4 hours, or in some examples, about 2 hours. Suitable temperatures for mixing, including mechanical stirring or ultrasonication, may be in a range between about 0° C. and about 120° C., or in some examples between about 20° C. and about 100° C., between about 30° C. and about 90° C., between about 40° C. and about 80° C., between about 50° C. and about 70° C., or in some examples, about 60° C.

Operations 622, 624 and/or 626 may be followed by operation 628, "APPLY 1ST AND 2ND CONDUCTING POLYMER LAYERS TO FORM 1ST AND 2ND ELECTRODES". At operation 628, the processor (e.g. processor 610) may control a coating or forming machine such as coating/forming machine 792 of FIG. 7. Suitable coating techniques can include one or more of: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; or the like. In some examples, operation 628 may direct machine 792 to coat the solvent mixture on a surface, e.g., by spin coating, dip coating, spray coating, and so on, depending on the coating functionality of machine 792. In other examples, if polymers 104 or 106 may be in a liquid state, e.g., via melting, or if polymers 104 or 106 may be mixed alone or together with polycyclic aromatic hydrocarbon 105 and/or metal cation 107 as a solid solution, coating/forming machine 792 may form a layer or article, e.g., by extrusion, co-extrusion, or injection molding, depending on the extrusion or molding functionality of coating/forming machine 794.

Operation 628 may be followed by operation 630, "CONTACT ELECTROLYTE TO 1st & 2nd CONDUCTING POLYMERS, PAH, & METAL". At operation 630, the processor (e.g. processor 610) may control electrolyte applicator 796 of FIG. 7. Suitable electrolyte contacting techniques can include, for example, contacting polymers 104 and 106 with a liquid electrolyte 110A, as in the case of making an electrochemical cell 100A as shown in FIG. 1A. Suitable electrolyte contacting techniques can also include, for example, co-extruding, contacting, or sequentially layering polymers 104 and 106 along with membrane electrolyte 110B, as in the case of making an electrochemical cell 100B as shown in FIG. 1B. Operation 630 may include one or more of: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; or the like, depending on the nature of membrane electrolyte 110B.

The operations included in the process of FIG. 6 described above are for illustration purposes. A process of making an example electrochemical cell as described herein may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 7 is a block diagram of an automated machine 700 that may be used for making an example dielectric material as described herein using the process steps outlined in FIG. 6, arranged in accordance with at least some embodiments described herein. As illustrated in FIG. 7, a manufacturing controller 790 may be coupled to the machines that may be used to carry out the steps described in FIG. 6, for example, a polymer mixing/reacting/applicator 792, a metal applicator machine 794, an electrolyte applicator machine 796, and/or an optional electrochemical controller 798. Manufacturing controller 790 may be operated by human control, by a remote controller 770 via network 710, or by machine executed instructions such as might be found in a computer program. Data associated with controlling the different processes of making the dielectric material may be stored at and/or received from data stores 780.

EXAMPLES 1-6

Following are several narrations of example methods of making electrochemical cells and corresponding batteries using the machines and steps described above for FIGS. 6 and 7. The example processes, materials, and amounts described below are for illustration purposes only and do not constitute a limitation on embodiments. Organosodium polymer electrochemical cells and corresponding batteries may be manufactured with a variety of materials, amounts, processes using the principles described herein.

EXAMPLE 1

Preparation of Example Electrochemical Cell 100A with a Non-Covalently Attached Polycyclic Aromatic Hydrocarbon A solution of polyaniline may be formed by dissolution in anhydrous tetrahydrofuran (THF) at a concentration of 0.005 mol of aniline repeat units in 100 milliliters of THF. The polyaniline-THF solution may be combined with an anhydrous THF solution containing about 0.005 mol or more of sodium naphthalene. The combined mixture polyaniline-sodium naphthalene-THF solution may be sonicated for about 20 minutes to assist mixing. The sonicated polyaniline-sodium naphthalene-THF solution may be formed into a thin layer by spin coating on first electrode 102 (e.g., a metal foil) at about 30° C. and anhydrous, atmospheric pressure. The thin layer may be baked 1 minute at about 150° C. to evaporate the THF to produce the sodium naphthalene doped polyaniline as a thin film of first conducting polymer 104. Separately, a solution of poly-para-phenylene vinylene as second conducting polymer 106 may be prepared, formed into a thin layer by spin coating on second electrode 108 (e.g., a metal foil) at about 30° C. and anhydrous, atmospheric pressure, and baked to evaporate the THF to produce second conducting polymer 106 as a thin film. The first and second conducting polymers 104 and 106 may be prepared as thin films at first and second electrodes 102 and 108. Next, first electrode and first conducting polymer 102/104 may be contacted to second electrode and second polymer 106/108 as shown in FIG. 1A. Electrolyte components may be added, e.g., polyethylene oxide and sodium perchlorate, and allowed to permeate the conducting polymer layers. The result may be an example electrochemical cell 100A formed as shown in FIG. 1A.

EXAMPLE 2

Preparation of Example Electrochemical Cell 100B with a Non-Covalently Attached Polycyclic Aromatic Hydrocarbon The first and second conducting polymers 104 and 106 may be prepared as thin films at first and second electrodes 102 and 108 as described in the procedure of the preceding Example. Next, first electrode and first conducting polymer 102/104, and second electrode and second polymer 106/108 may be contacted to either side of an ionomer membrane 110B as shown in FIG. 1B. The result may be an example electrochemical cell 100B formed as shown in FIG. 1B. Additional electrolyte components may be added, e.g., polyethylene oxide and sodium perchlorate, and allowed to permeate the conducting polymer layers.

EXAMPLE 3

Preparation of Example Electrochemical Cell 100A with a Covalently Attached Polycyclic Aromatic Hydrocarbon In the preceding examples, the polycyclic aromatic hydrocarbon radical anion 105 may be in noncovalent contact with the first conducting polymer 104, the polyaniline. In the present example, the naphthalene may be first covalently coupled to the nitrogen of the polyaniline. A solution of polyaniline may be formed by dissolution in anhydrous tetrahydrofuran (THF) at a concentration of about 0.005 mol of aniline repeat units in about 100 milliliters of anhydrous THF. The polyaniline-THF solution may be combined with an anhydrous THF solution containing about 0.005 mol of naphthyl bromide and sonicated for about 20 minutes to assist reaction. The resulting THF solution of N-naphthyl polyaniline may then be stirred and sonicated over about 0.005 mole of sodium metal until the sodium metal dissolves, forming the radical anion of the N-naphthyl group. A thin layer may be formed by spin coating on first electrode 102 (e.g., a metal foil) at about 30° C. and anhydrous, atmospheric pressure. The thin layer may be baked about 1 minute at about 150° C. to evaporate the THF to produce the sodium N-naphthalene doped polyaniline as a thin film of first conducting polymer 104. Separately, a solution of poly-para-phenylene vinylene as second conducting polymer 106 may be prepared, formed into a thin layer by spin coating on second electrode 108 (e.g., a metal foil) at about 30° C. and anhydrous, atmospheric pressure, and baked to evaporate the THF to produce second conducting polymer 106 as a thin film. The first and second conducting polymers 104 and 106 may be prepared as thin films at first and second electrodes 102 and 108. Next, first electrode and first conducting polymer 102/104 may be contacted to second electrode and second polymer 106/108 as shown in FIG. 1A. Electrolyte components may be added, e.g., polyethylene oxide and sodium perchlorate, and allowed to permeate the conducting polymer layers. The present example procedure may produce an electrochemical cell 100A as shown in FIG. 1A wherein the polycyclic aromatic hydrocarbon radical anion 105 may be covalently attached to first polymer 104.

EXAMPLE 4

Preparation of Example Electrochemical Cell 100B with a Covalently Attached Polycyclic Aromatic Hydrocarbon The first and second conducting polymers 104 and 106 may be prepared as thin films at first and second electrodes 102 and 108 as described in the procedure of the preceding Example. Next, first electrode and first conducting polymer 102/104, and second electrode and second polymer 106/108 may be contacted to either side of an ionomer membrane 110B as shown in FIG. 1B. The result may be an example electrochemical cell 100B formed as shown in FIG. 1B. Additional electrolyte components may be added, e.g., polyethylene oxide and sodium perchlorate, and allowed to permeate the conducting polymer layers.

EXAMPLE 5

Preparation of Example Battery 200A with a Non-Covalently Attached Polycyclic Aromatic Hydrocarbon Two example electrochemical cells 100A may be constructed as described above in Example 1. The two example electrochemical cells may be coupled in series as shown in FIG. 2A, resulting in example battery 200A. Since the electrochemical cells may be constructed as in Example 1, the polycyclic aromatic hydrocarbon (here, naphthalene or sodium naphthalene) may be in non-covalent contact with the first conducting polymer (here, polyaniline).

EXAMPLE 6

Preparation of Example Battery 200B with a Covalently Attached Polycyclic Aromatic Hydrocarbon Two example electrochemical cells 100B may be constructed as described above in Example 4. The two example electrochemical cells may be coupled in series as shown in FIG. 2A, resulting in example battery 200B. Since the electrochemical cells may be constructed as in Example 4, the polycyclic aromatic hydrocarbon (here, naphthalene or sodium naphthalene) may be a group covalently bonded to the first conducting polymer (here, polyaniline).

EXAMPLEs 7-13

Following are several narrations of example methods of making example first conducting polymers 104 that may be covalently substituted with a polycyclic aromatic hydrocarbon. Also included are steps for reacting the polymers to reduce the polycyclic aromatic hydrocarbon to polycyclic aromatic hydrocarbon radical anion 105 and to oxidize a corresponding metal to metal cation 107, all arranged in accordance with at least some embodiments discussed herein.

EXAMPLE 7

Synthesis of a Regio-Random Polyfuran Conducting Polymer with a Covalent Polycyclic Aromatic Hydrocarbon Substituent See Reaction Scheme 420 in FIG. 4D. An anhydrous solution of 100 milliliters of THF may be prepared containing about 0.01 mole 1-bromonaphthalene and about 0.01 mole of furan-3-boronic acid pinacol ester. About 0.01 mole of potassium carbonate and about 0.0003 mole of tetrakis triphenylphosphine palladium catalyst may be added, and the resulting mixture may be stirred and refluxed under an inert atmosphere for about 12 hours. The mixture may be then cooled, washed with dilute aqueous citric acid, and the solvent may be removed. The resulting solid, 3-naphth-1-yl-furan, may be dissolved in about 25 milliliters of dry acetonitrile that may be about 0.1 M in tetrabutylammonium perchlorate electrolyte. Appropriate electrodes may be added and a cyclic voltammogram may be run to determine an appropriate electro-polymerization potential in a range between about 1 and 2 volts. The solution may be then subjected to the determined potential until about 0.01 mole of charge has passed. The resulting polymer film may be removed from the anode and used directly. Alternatively, the film may be extracted with refluxing THF in a Soxhlet apparatus. The THF solution contains polyfuran regio-randomly substituted with 1-naphthyl groups, and may be used for spin coating, dip coating, etc. The solution of polyfuran regio-randomly substituted with 1-naphthyl groups may also be stirred and sonicated with about 0.01 mole of metallic sodium until the sodium dissolves, at least in part. The result may include a poly radical anion of polyfuran regio-randomly substituted with 1-naphthyl groups.

EXAMPLE 8

Synthesis of a Regio-Random Polythiophene Conducting Polymer with a Covalent Polycyclic Aromatic Hydrocarbon Substituent See Reaction Scheme 422 in FIG. 4D. An anhydrous solution of 100 milliliters of THF may be prepared containing about 0.01 mole 2-bromonaphthalene and about 0.01 mole of thiophene-3-boronic acid pinacol ester. About 0.01 mole of potassium carbonate and about 0.0003 mole of tetrakis triphenylphosphine palladium catalyst may be added, and the resulting mixture may be stirred and refluxed under an inert atmosphere for about 12 hours. The mixture may be then cooled, washed with dilute aqueous citric acid, and the solvent may be removed. The resulting solid, 3-naphth-2-yl-thiophene, may be dissolved in about 25 milliliters of dry acetonitrile that may be about 0.1 M in tetrabutylammonium perchlorate electrolyte. Appropriate electrodes may be added and a cyclic voltammogram may be run to determine an appropriate electro-polymerization potential between about 1 and 2 volts. The solution may be then subjected to the determined potential until about 0.01 mole of charge has passed. The resulting polymer film may be removed from the anode and used directly. Alternatively, the film may be extracted with refluxing THF in a Soxhlet apparatus. The THF solution contains polythiophene regio-randomly substituted with 2-naphthyl groups, and may be used for spin coating, dip coating, etc. The THF solution containing polythiophene regio-randomly substituted with 2-naphthyl groups may also be stirred and sonicated with about 0.01 mole of metallic sodium until the sodium dissolves, at least in part. The result may include a poly radical anion of polythiophene regio-randomly substituted with 2-naphthyl groups.

EXAMPLE 9

Synthesis of a Regio-Random Polypyrrole Conducting Polymer with a C-Bonded Covalent Polycyclic Aromatic Hydrocarbon Substituent See Reaction Scheme 424 in FIG. 4D. An anhydrous solution of 100 milliliters of THF may be prepared containing about 0.01 mole 1-bromoanthracene and 0.01 mole of 1-(tri-isopropylsilyl)-1H-pyrrole-3-boronic acid. About 0.01 mole of potassium carbonate and about 0.0003 mole of tetrakis triphenylphosphine palladium catalyst may be added, and the resulting mixture may be stirred and refluxed under an inert atmosphere for about 12 hours. The mixture may be then cooled, washed with dilute aqueous citric acid, dried, and the solvent may be removed. The resulting solid, N-triisopropyl-silyl-3-anthracen-1-yl-pyrrole, may be dissolved in anhydrous THF, cooled in an ice bath and about 0.015 mole of BF3-etherate may be added. The mixture may be stirred and allowed to rise to room temperature, and conversion of N-tri-isopropylsilyl-3-anthracen-1-yl-pyrrole to 3-anthracen-1-yl-pyrrole may be monitored by gas chromatography mass spectrometry. When the reaction has run to completion, the mixture may be washed with water or a basic buffer solution, and the organic layer may be separated, dried, and the solvent evaporated under vacuum. The resulting solid 3-anthracen-1-yl-pyrrole may be dissolved in about 25 milliliters of dry acetonitrile that may be about 0.1 M in tetrabutylammonium perchlorate electrolyte. Appropriate electrodes may be added and a cyclic voltammogram may be run to determine an appropriate electro-polymerization potential between about 1 and 2 volts. The solution may be then subjected to the determined potential until about 0.01 mole of charge has passed. The resulting polymer film may be removed from the anode and used directly. Alternatively, the film may be extracted with refluxing THF in a Soxhlet apparatus. The THF solution contains polypyrrole regio-randomly C-substituted with 1-anthracyl groups, and may be used for spin coating, dip coating, etc. The THF solution containing polypyrrole regio-randomly C-substituted with 1-anthracyl groups may also be stirred and sonicated with about 0.01 mole of metallic sodium until the sodium dissolves, at least in part. The result may include a poly radical anion of polypyrrole regio-randomly-substituted with 1-anthracyl groups.

EXAMPLE 10

Synthesis of a Regio-Regular Polythiophene Conducting Polymer with a Covalent Polycyclic Aromatic Hydrocarbon Substituent See Reaction Scheme 428 in FIG. 4D. About 0.01 mole of 3-naphth-2-yl-thiophene, prepared as described above in Example 8, may be stirred in about 100 milliliters of anhydrous THF with about 0.022 mole of N-bromo-succinimide. The mixture may be irradiated with a UV-emitting quartz tube lamp, and the conversion of 3-naphth-2-yl-thiophene to 3-naphth-2-yl-2,5-dibromothiophene may be monitored by gas chromatography mass spectrometry. When the reaction has run to completion, the mixture may be washed with water, and the organic layer may be separated, dried, and the solvent evaporated under vacuum. In the next step, about 0.01 mole of 3-naphth-2-yl-2,5-dibromothiophene may be dissolved in about 100 milliliters of anhydrous THF, cooled in an ice bath, and an excess of activated "Rieke" zinc powder may be added, and stirred and allowed to rise to room temperature. The resulting mixture of organometallic isomers may, without further isolation, be combined with a catalytic amount, about 0.0002 mole of 1,2-bis(diphenylphosphino) ethane nickel(II) chloride. The mixture may be heated to reflux and allowed to react for 12 hours. The mixture may be then cooled, washed with dilute aqueous citric acid, the organic layer may be dried, and the solvent may be removed to leave a residue. The residue may be extracted with refluxing THF in a Soxhlet apparatus. The THF solution contains poly(3-naphth-2-ylthiophene), and may be used for spin coating, dip coating, etc. The THF solution containing poly(3-naphth-2-ylthiophene) may also be stirred and sonicated with about 0.01 mole of metallic sodium until the sodium dissolves, at least in part. The result may include a poly radical anion of poly(3-naphth-2-ylthiophene).

EXAMPLE 11

Synthesis of a Polypyrrole Conducting Polymer from a Monomer with an N-Bonded Polycyclic Aromatic Hydrocarbon Substituent See Reaction Scheme 430 in FIG. 4E. About 0.01 mole of pyrrole, 0.011 mole of 2-bromoanthracene, and about 0.001 mole of 1,8-bis(dimethylamino)naphthalene may be dissolved in about 100 milliliters of THF, and heated to reflux. The conversion of pyrrole to N-anthracen-2-yl-pyrrole may be monitored by gas chromatography mass spectrometry. When the reaction has run to completion, the mixture may be washed with a pH 7 aqueous buffer, and the organic layer may be separated and dried. The solid residue may be purified on a silica gel column to afford N-anthracen-2-yl-pyrrole. The purified N-anthracen-2-yl-pyrrole may be dissolved in about 25 milliliters of dry acetonitrile that may be about 0.1 M in tetrabutylammonium perchlorate electrolyte. Appropriate electrodes may be added and a cyclic voltammogram may be run to determine an appropriate electro-polymerization potential between about 1 and 2 volts. The solution may be then subjected to the determined potential until about 0.01 mole of charge has passed. The resulting polymer film may be removed from the anode and used directly. Alternatively, the film may be extracted with refluxing THF in a Soxhlet apparatus. The THF solution contains poly((N-anthracen-2-yl)-pyrrole), and may be used for spin coating, dip coating, etc. The THF solution containing poly((N-anthracen-2-yl)-pyrrole) may also be stirred and sonicated with about 0.01 mole of metallic sodium until the sodium dissolves, at least in part. The result may include a poly radical anion of poly((N-anthracen-2-yl)-pyrrole).

EXAMPLE 12

Synthesis of a Polyaniline Conducting Polymer with an N-Bonded Polycyclic Aromatic Hydrocarbon Substituent by Arylating Polyaniline See Reaction Scheme 432 in FIG. 4E. A solution of polyaniline may be formed by dissolution in anhydrous tetrahydrofuran (THF) at a concentration of about 0.005 mol of aniline repeat units in about 50 milliliters of anhydrous THF. The polyaniline-THF solution may be combined with about 50 milliliters of an anhydrous THF solution containing about 0.005 mol of 9-bromoanthracene and sonicated for about 20 minutes to assist reaction. The THF solution contains poly ((N-anthracen-9-yl)-aniline), which may be used for spin coating, dip coating, etc. The THF solution containing poly ((N-anthracen-9-yl)-aniline) may also be stirred and sonicated with about 0.01 mole of metallic sodium until the sodium dissolves, at least in part. The result may include a poly radical anion of poly((N-anthracen-9-yl)-aniline).

EXAMPLE 13

Synthesis of a Regio-Regular Polythiophene Vinylene with a Covalent Polycyclic Aromatic Hydrocarbon Substituent See Reaction Scheme 434 in FIG. 4E. A solution of 0.01 mole of 3-naphth-2-yl-2,5-dibromothiophene (prepared as described in Example 10) may be prepared in about 10 milliliters of anhydrous THF and cooled using a dry ice/acetone bath under an inert atmosphere. About 0.021 mole of n-butyllithium in hexane may be added, and the mixture may be stirred for about 30 minutes. Next, about 0.021 mole of 1-formyl piperidine may be added, and the mixture may be stirred and allowed to rise to room temperature over about 12 hours. The reaction mixture may be washed with aqueous ammonium chloride, and the organic layer may be dried and evaporated to form a residue. The residue may be purified via silica gel chromatography to give 3-(naphthalen-2-yl) thiophene-2,5-dicarbaldehyde.

About 0.022 mole of lithium aluminum hydride may be stirred into about 50 milliliters of anhydrous THF to make a slurry under an inert atmosphere, and cooled in an ice bath. About 0.01 mole of 3-(naphth-2-yl)-2,5-diformylthiophene may be dissolved in about 10 milliliters of anhydrous THF and added to the slurry with stirring. The reaction may be stirred and allowed to rise to room temperature, and then refluxed for about 2 hours. The reaction mixture may be cooled, carefully quenched with about 50 milliliters of water and washed with about 0.1 M sodium hydroxide. The organic layer may be dried, and the solvent may be removed to leave a residue. The residue may be purified via silica gel chromatography to give (3-(naphthalen-2-yl)thiophene-2,5-diyl) dimethanol.

About 0.01 mole of (3-(naphthalen-2-yl)thiophene-2,5-diyl)dimethanol may be dissolved in anhydrous THF, with stirring, under an inert atmosphere, and cooled in an ice bath. About 0.024 mole of thionyl chloride in toluene may be added and the reaction may be stirred and allowed to rise to room temperature. After about 2 hours, the reaction may be carefully quenched by adding about 100 milliliters of half-saturated sodium carbonate solution. The reaction mixture may be washed with water, the organic layer may be dried, and the solvent may be removed to form a residue. The residue may be purified via silica gel chromatography to give 2,5-bis(chloromethyl)-3-(naphthalen-2-yl)thiophene.

About 0.01 mole of 2,5-bis(chloromethyl)-3-(naphthalen-2-yl)thiophene may be dissolved in about 10 milliliters of ethanol, with stirring. About 0.031 mole of sodium diethyldithiocarbamate trihydrate may be added and the reaction may be stirred at ambient temperature over 2 hours. The reaction mixture may be extracted with diethyl ether and the combined ether extracts may be dried and evaporated to form a residue. The residue may be purified via silica gel chromatography to give 3-(naphthalen-2-yl)thiophene-2,5-diylbismethylene N,N-diethyl dithiocarbamate.

A solution of about 0.01 mole dry 3-(naphthalen-2-yl) thiophene-2,5-diylbismethylene N,N-diethyl dithiocarbamate may be prepared in about 50 milliliters of anhydrous THF under an inert atmosphere, and cooled in a dry ice/acetone bath. Lithium diisopropyl amide (about 0.022 mole as a 2 M solution in THF/n-hexane) may be added, and the reaction may be stirred and allowed to rise to about 0° C. over about two hours. About 25 milliliters of ethanol may be added slowly to quench the reaction. The resulting mixture may be poured into ice water and the water layer may be neutralized with dilute hydrochloric acid. The resulting mixture may be extracted with chloroform. The combined chloroform fractions may be combined and evaporated under reduced pressure to leave a residue. The residue may be dissolved in THF and precipitated by adding cold methanol. The unconjugated N,N-diethyl dithiocarbamate-substituted polymer which precipitates (see Reaction Scheme 434 in FIG. 4E) may be dried and reserved for the next step.

About 1 milligram of the unconjugated N,N-diethyl dithiocarbamate-substituted polymer from the previous step (see also Reaction Scheme 434 in FIG. 4E) may be dissolved in about 50 milliliters of dichlorobenzene and may be refluxed under stirring for about 3 hours. The reaction mixture may be cooled to room temperature and an amount of the dichlorobenzene may be evaporated until a slurry may be formed. The slurry may be combined with hexane to precipitate the polymer. The precipitate may be dried to give poly((3-(naphthalen-2-yl)thiophene vinylene).

The poly((3-(naphthalen-2-yl)thiophene vinylene) may be dissolved in THF or another solvent and may be used for spin coating, dip coating, etc. The poly((3-(naphthalen-2-yl)thiophene vinylene) solution may also be stirred and sonicated with about 0.01 mole of metallic sodium until the sodium dissolves, at least in part. The result may include a poly radical anion of poly((3-(naphthalen-2-yl)thiophene vinylene).

FIG. 8 illustrates a general purpose computing device that may be used to control the automated machine 700 of FIG. 7 or similar manufacturing equipment in making an example electrochemical cell, arranged in accordance with at least some embodiments described herein. In a basic configuration 802, computing device 800 typically may include one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a cache memory 812, a processor core 814, and registers 816. Example processor core 814 may include an arithmetic logic unit (ALU), a floating point unit (FPU), a digital signal processing core (DSP Core), or any combination thereof. An example memory controller 818 may also be used with processor 804, or in some implementations memory controller 815 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more manufacturing control applications 822, and program data 824. Manufacturing control application 822 may include a control module 826 that may be arranged to control automated machine 700 of FIG. 7 and any other processes, methods and functions as discussed above. Program data 824 may include, among other data, material data 828 for controlling various aspects of the automated machine 700. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices may include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 806, removable storage devices 836 and non-removable storage devices 838 may be examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 866 to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 544 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 may include a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a physical server, virtual server, a computing cloud, or a hybrid device that include any of the above functions. Computing device 800 may also be implemented as a personal computer including both laptop computer and non-laptop computer configurations. Moreover computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that may be adapted to operate together. Such networks may be configured to provide communication between the nodes described herein. By way of example, and not limitation, these networks may include wireless media such as acoustic, RF, infrared and other wireless media. Furthermore, the networks may be portions of the same network or separate networks.

FIG. 9 illustrates a block diagram of an example computer program product that may be used to control the automated machine of FIG. 7 or similar manufacturing equipment in making an example electrochemical cell, arranged in accordance with at least some embodiments described herein. In some examples, as shown in FIG. 9, computer program product 900 may include a signal bearing medium 902 that may also include machine readable instructions 904 that, when executed by, for example, a processor, may provide the functionality described above with respect to FIG. 6 through FIG. 8. For example, referring to processor 790, one or more of the tasks shown in FIG. 9 may be undertaken in response to instructions 904 conveyed to the processor 790 by medium 902 to perform actions associated with making an example electrochemical cell as described herein. Some of those instructions may include, for example, one or more instructions for forming the first and second electrodes from the first and second conducting polymers, where the first conducting polymer may include or contact the polycyclic aromatic hydrocarbon. Also included may be one or more instructions for contacting the metal to the polycyclic aromatic hydrocarbon. Further included may be one or more instructions for contacting an electrolyte to the first and second conducting polymers, the first and second electrodes, the polycyclic aromatic hydrocarbon and/or the polycyclic aromatic hydrocarbon radical anion, and the metal and/or metal cation. Also included may be one or more instructions for reducing the polycyclic aromatic hydrocarbon to the polycyclic aromatic hydrocarbon radical anion and/or oxidizing the metal to the metal cation.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). For example, computer program product 900 may be conveyed to the processor 904 by an RF signal bearing medium 902, where the signal bearing medium 902 may be conveyed by a wireless communications medium 910 (e.g., a wireless communications medium conforming with the IEEE 802.11 standard). While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks may be performed by remote processing devices that may be linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a configuration environment, which may facilitate configuration of software/hardware products and services for a variety of purposes. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

In various examples, an example electrochemical cell may include one or more of the following. The electrochemical cell may include a first electrode that may include a first conducting polymer. The electrochemical cell may further include at least one polycyclic aromatic hydrocarbon radical anion adapted to contact the first conducting polymer. The electrochemical cell may also include a second electrode that may include a second conducting polymer. The electrochemical cell may further include a cation. The electrochemical cell may also include an electrolyte adapted to conductively couple the first and the second conducting polymers, the polycyclic aromatic hydrocarbon radical anion, and the cation.

In various examples, a battery may include one or more example electrochemical cells. In various examples, each example electrochemical cell in the example battery may include one or more of the following. For example, the battery may include a first electrode that may include a first conducting polymer. The battery may also include at least one polycyclic aromatic hydrocarbon radical anion that contacts the first conducting polymer. The battery may further include a second electrode that may include a second conducting polymer. The battery may also include a cation. The battery may further include an electrolyte that conductively couples the first and the second conducting polymers, the polycyclic aromatic hydrocarbon radical anion, and the cation.

In various examples, at least two of the example electrochemical cells, for example, the electrochemical cells in the example battery, may be electrically coupled in parallel. In various examples, at least two of the example electrochemical cells, for example, the electrochemical cells in the example battery may be electrically coupled in series.

In various examples of the example electrochemical cell, the cation may be an alkali metal cation, an alkaline earth metal cation, or a mixture thereof. In some examples, the cation may be Na+.

In various examples of the example electrochemical cell, the first conducting polymer may be a homopolymer, a block copolymer, a random copolymer, or a graft copolymer. In some examples, the first conducting polymer may include a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a combination thereof. In some examples, the first conducting polymer may be substituted by the polycyclic aromatic hydrocarbon radical anion. In some examples, the first conducting polymer may include: a polyacetylene, a poly(phenylene vinylene), a poly(fluorene), a polypyrene, a polyazulene, a polynaphthalene, a poly(pyrrole), a polyindole, a polyazepine, a polyaniline, a polypyridine, a poly(thiophene), a poly(thiophene vinylene), a poly(phenylene sulfide), or a combination thereof. In some examples, the first conducting polymer may include a repeat unit having the formulae:

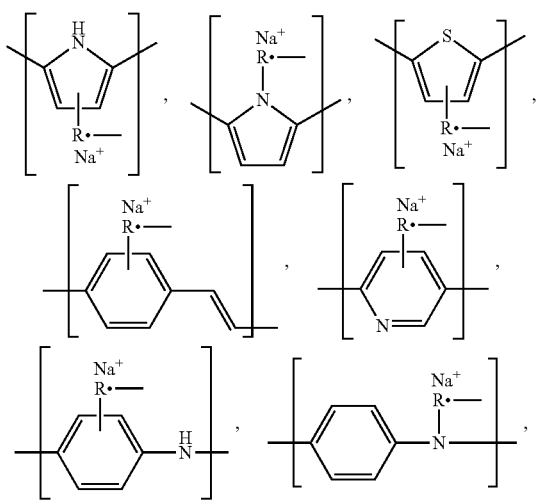

or a combination thereof, wherein —R·⁻ represents the polycyclic aromatic hydrocarbon radical anion.

In various examples of the example electrochemical cell, the polycyclic aromatic hydrocarbon radical anion may include a naphthalene radical anion, an anthracene radical anion, or a combination thereof. In various examples, wherein the second conducting polymer may be polycarbazole, the cation may be Na$^+$, and the polycyclic aromatic hydrocarbon radical anion may be naphthalene radical anion or anthracene radical anion.

In various examples of the example electrochemical cell, the second conducting polymer may include a polyacetylene, a polyarylene, a polyarylene vinylene, a polyarylene ethynylene, or a combination thereof. In some examples, the second conducting polymer may include poly-para-phenylene, poly-para-phenylene vinylene, poly-para-phenylene ethynylene, polyacetylene, or a combination thereof.

In various examples of the example electrochemical cell, the polycyclic aromatic hydrocarbon radical anion may include the radical anion of naphthalene, acenapthalene, acenaphthylene, acephenanthrylene, aceanthrylene, anthracene, phenanthrene, fluorene, biphenylene, fluoranthene, triphenylene, chrysene, tetracene, perylene, tetraphenylene, tetraphene, picene, pentaphene, benzo[a]pyrene, benzo[e]pyrene, benzo[ghi]perylene, coronene, or rubicene, or a derivative thereof.

In various examples of the example electrochemical cell, the electrolyte may include a polyoxyalkylene, a polyoxyalkylene alcohol, an alkyl ether, a cycloalkyl ether, an alkylene carbonate, a cycloalkylene carbonate, an alkanone, a cycloalkanone, a lactone, or a combination thereof. In some examples, the electrolyte may include one or more anions selected from the group consisting of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, and nitrate.

In various examples of the example electrochemical cell, the electrolyte may include a salt of an ionomer that separates the first conducting polymer from the second conducting polymer. In some examples, the ionomer may include a polytetrafluoroethylene: perfluorosulfonic acid copolymer.

In various examples of the example electrochemical cell, the polycyclic aromatic hydrocarbon radical anion may be in noncovalent contact with the first conducting polymer.

In various examples, an example method of making an electrochemical cell may include one or more of the following steps. For example, the method may include forming a first electrode from a first conducting polymer. The method may also include contacting the first conducting polymer to a polycyclic aromatic hydrocarbon. The method may also include forming a second electrode from a second conducting polymer. The method may further include contacting the polycyclic aromatic hydrocarbon with a metal. The method may also include conductively coupling an electrolyte to the first and the second conducting polymers, the polycyclic aromatic hydrocarbon, and the metal. The method may further include reducing the polycyclic aromatic hydrocarbon to form a polycyclic aromatic hydrocarbon radical anion and oxidizing the metal to form a metal cation.

In various examples, the example method may include chemically reacting the polycyclic aromatic hydrocarbon with the metal to form the polycyclic aromatic hydrocarbon radical anion and the metal cation.

In various examples, the example method may include applying an electric current across the first and second electrodes to electrochemically react the polycyclic aromatic hydrocarbon with the metal to form the polycyclic aromatic hydrocarbon radical anion and the metal cation.

In various examples, the example method may include forming the first electrode by forming a layer of the first conducting polymer at a first metal foil.

In various examples, the method may include forming the second electrode by forming a layer of the second conducting polymer at a second metal foil.

In various examples, the example method may include separating the first conducting polymer from the second conducting polymer with the ionomer, wherein the electrolyte may include a salt of an ionomer.

In various examples of the example method, the cation may be an alkali metal cation, an alkaline earth metal cation, or a mixture thereof. In some examples, the cation may be $Na^+$.

In various examples of the example method, the first conducting polymer may be a homopolymer, a block copolymer, a random copolymer, or a graft copolymer. In some examples, the first conducting polymer may include a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a combination thereof. In some examples, the first conducting polymer may be substituted by the polycyclic aromatic hydrocarbon radical anion. In some examples, the first conducting polymer may include: a polyacetylene, a poly(phenylene vinylene), a poly(fluorene), a polypyrene, a polyazulene, a polynaphthalene, a poly(pyrrole), a polyindole, a polyazepine, a polyaniline, a polypyridine, a poly(thiophene), a poly(thiophene vinylene), a poly(phenylene sulfide), or a combination thereof. In some examples, the first conducting polymer may include a repeat unit having the formulae:

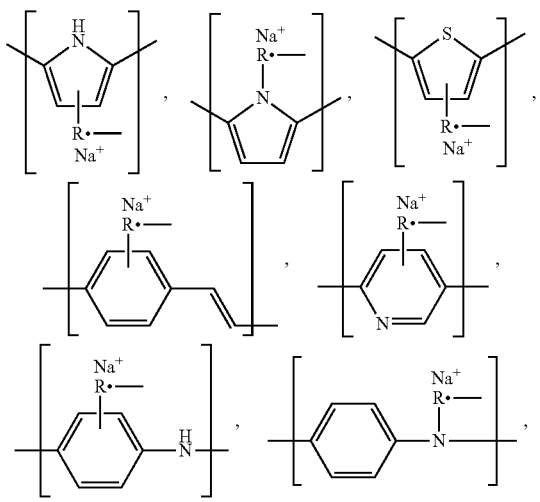

or a combination thereof, wherein —$R\cdot^-$ represents the polycyclic aromatic hydrocarbon radical anion.

In various examples of the example method, the polycyclic aromatic hydrocarbon radical anion may include a naphthalene radical anion, an anthracene radical anion, or a combination thereof. In various examples, wherein the second conducting polymer may be polycarbazole, the cation may be $Na^+$, and the polycyclic aromatic hydrocarbon radical anion may be naphthalene radical anion or anthracene radical anion.

In various examples of the example method, the second conducting polymer may include a polyacetylene, a polyarylene, a polyarylene vinylene, a polyarylene ethynylene, or a combination thereof. In some examples, the second conducting polymer may include poly-para-phenylene, poly-para-phenylene vinylene, poly-para-phenylene ethynylene, polyacetylene, or a combination thereof.

In various examples of the example method, the polycyclic aromatic hydrocarbon radical anion may include the radical anion of naphthalene, acenapthalene, acenaphthylene, acephenanthrylene, aceanthrylene, anthracene, phenanthrene, fluorene, biphenylene, fluoranthene, triphenylene, chrysene, tetracene, perylene, tetraphenylene, tetraphene, picene, pentaphene, benzo[a]pyrene, benzo[e]pyrene, benzo[ghi]perylene, coronene, or rubicene, or a derivative thereof.

In various examples of the example method, the electrolyte may include a polyoxyalkylene, a polyoxyalkylene alcohol, an alkyl ether, a cycloalkyl ether, an alkylene carbonate, a cycloalkylene carbonate, an alkanone, a cycloalkanone, a lactone, or a combination thereof. In some examples, the electrolyte may include one or more anions selected from the group consisting of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, and nitrate.

In various examples of the example method, the electrolyte may include a salt of an ionmer that separates the first conducting polymer from the second conducting polymer. In some examples, the ionomer may include a polytetrafluoroethylene:perfluorosulfonic acid copolymer.

In various examples of the example method, the polycyclic aromatic hydrocarbon radical anion may be in noncovalent contact with the first conducting polymer.

In various examples, a computer-readable storage medium may include one or more instructions stored thereon for one or more of the steps of the example methods described herein, e.g., for making an electrochemical cell. The instructions may include, for example, forming a first electrode from a first conducting polymer, the first conducting polymer including a polycyclic aromatic hydrocarbon. The instructions may also include forming a second electrode from a second conducting polymer. The instructions may further include contacting the polycyclic aromatic hydrocarbon with a metal. The instructions may also include conductively coupling an electrolyte to the first and the second conducting polymers, the polycyclic aromatic hydrocarbon, and the metal. The instructions may further include reducing the polycyclic aromatic hydrocarbon to form a polycyclic aromatic hydrocarbon radical anion. The instructions may also include oxidizing the metal to form a metal cation.

In various examples, the computer-readable storage medium may include instructions stored thereon for electrically coupling the first electrochemical cell to a second electrochemical cell, wherein the first and second electrochemical cells may be coupled in parallel or coupled in series.

The terms "a" and "an" as used herein mean "one or more" unless the singular is expressly specified. For example, reference to "a base" may include a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

As used herein, the terms "optional" and "optionally" mean that the subsequently described circumstance may or may not occur, so that the description includes instances where the circumstance occurs and instances where it does not.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles CN); and the like.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl, tetrahydronaphthyl, and the like), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members of which one or more may be a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these may be referred to as "substituted heterocyclyl groups." Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which may be 2, 3-, 4-, 5-, or 6-substituted, or disubstituted with various substituents such as those listed above.

Heteroaryl groups may be aromatic ring compounds containing 5 or more ring members, of which one or more may be a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings may be aromatic such as indolyl groups and include fused ring compounds in which only one of the rings may be aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution may be referred to as "substituted heteroaryl groups." Representative substituted heteroaryl groups may be substituted one or more times with various substituents such as those listed above.

Heteroaralkyl groups may be alkyl groups as defined above in which a hydrogen or carbon bond of an alkyl group may be replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

As used herein, a polycyclic aromatic hydrocarbon, e.g., corresponding to polycyclic aromatic hydrocarbon 105, may be a compound of carbon and hydrogen that includes two or more aromatic rings, which may be fused. Example polycyclic aromatic hydrocarbons include, but are not limited to, naphthalene, anthracene, phenanthrene, pyrene, picene, chrysene, perylene, tetracene, pentacene, hexacene, heptacene, octacene, nonacene, decacene, tetraphene, pentaphene, hexaphene, heptaphene, octaphene, nonaphene, decaphene, tetrahelicene, pentahelicene, hexahelicene, heptahelicene, octahelicene, nonahelicene, decahelicene, binaphthylene (dibenzo[b,h]biphenylene), trinaphthylene, tetranaphthylene, biphenylene, triphenylene, tetraphenylene, pentaphenylene, hexaphenylene, heptaphenylene, octaphenylene, nonaphenylene, decaphenylene, acenapthalene, acenaphthylene, fluorene, phenalene, fluoranthene, acephenanthrylene, aceanthrylene, benzo[b]fluoranthene, benzo[j]fluoranthene, benzo[k]fluoranthene, pleiadene, benzo[a]pyrene, benzo[e]pyrene, benzo[ghi]perylene, dibenz(a,h)anthracene, coronene, rubicene, pyranthrene, ovalene, and the like. In various examples, polycyclic aromatic hydrocarbons include, but are not limited to those shown in FIG. 3B, e.g., naphthalene 326, acenapthalene 328, acenaphthylene 330, acephenanthrylene 332, aceanthrylene 334, anthracene 336, phenanthrene 338, fluorene 340, biphenylene 342, fluoranthene 344, triphenylene 346, chrysene 348, tetracene 350, perylene 352, tetraphenylene 354, tetraphene 356, picene 358, pentaphene 360, benzo[a]pyrene 362, benzo[e]pyrene 364, benzo[ghi]perylene 366, coronene 368, and rubicene 370. Many such polycyclic aromatic hydrocarbons are commercially available, as are various substituted derivatives thereof.

As used herein, a polycyclic aromatic hydrocarbon radical anion such as polycyclic aromatic hydrocarbon radical anion 105 may be prepared by electrochemical or chemical reduction of the corresponding polycyclic aromatic hydrocarbon. For example, sodium naphthalene, the sodium salt of naphthalene radical anion, may be prepared by stirring an anhydrous tetrahydrofuran solution of naphthalene with metallic sodium. Likewise, the potassium salt of anthracene radical anion may be prepared by stirring an anhydrous tetrahydrofuran solution of anthracene with metallic potassium. Some polycyclic aromatic hydrocarbons may be commercially available in their radical anion state, such as sodium naphthalene.

Groups described herein having two or more points of attachment (i.e., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit. For example, compound 310 in FIG. 3A may be referred to as "poly-para-phenylene" since the repeat unit phenyl may be linked at two points of attachment, located para with respect to each other on the ring. In another example, polymers generally may be referred to in the same manner, for example, a polyarylene is a polymer linked at two points of attachment through an aryl group (e.g., poly-para-phenylene). Other examples include polyheteroarylenes (e.g., compounds 302-306 in FIG. 3A), polyarylene vinylenes (e.g., compound 312 in FIG. 3A), polyheteroarylene vinylenes (e.g., compound 308 in FIG. 3A), and so on. Note that some common names in the art may not follow the above-described pattern. For example, compound 302 in FIG. 3A is a polyheteroarylene, but may be commonly known as "polypyrrole" without the "ene" suffix.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, hexoxy, and the like. Examples of branched alkoxy groups include, but are not limited to, isopropoxy, sec-butoxy, tert-butoxy, isopentoxy, isohexoxy, and the like. Examples of cycloalkoxy groups include, but are not limited to, cyclopropyloxy, cyclobutyloxy, cyclopentyloxy, cyclohexyloxy, and the like. Representative substituted alkoxy groups may be substituted one or more times with substituents such as those listed above.

The term "amine" (or "amino"), as used herein, refers to $NR_5R_6$ groups, wherein $R_5$ and $R_6$ may be independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine may be alkylamino, dialkylamino, arylamino, or alkylarylamino. In other embodiments, the amine may be $NH_2$, methylamino, dimethylamino, ethylamino, diethylamino, propylamino, isopropylamino, phenylamino, or benzylamino. The term "alkylamino" may be defined as $NR_7R_8$, wherein at least one of $R_7$ and $R_8$ may be alkyl and the other may be alkyl or hydrogen. The term "arylamino" may be defined as $NR_9R_{10}$, wherein at least one of $R_9$ and $R_{10}$ may be aryl and the other may be aryl or hydrogen.

The term "halogen" or "halo," as used herein, refers to bromine, chlorine, fluorine, or iodine. In some embodiments, the halogen may be fluorine. In other embodiments, the halogen may be chlorine or bromine.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or coupled together with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

What is claimed is:

1. An electrochemical cell, comprising:
   a first electrode that includes a first conductive polymer;
   a fused polycyclic aromatic hydrocarbon radical anion configured to contact the first conductive polymer;
   a second electrode that includes a second conductive polymer, wherein the first electrode and the second electrode are composed from a metal, an alloy, or a conductive oxide selected from one or more of: copper, aluminum, tin, lead, iron, chromium, cobalt, nickel, silver, gold, platinum, palladium, vanadium, manganese, titanium, tungsten, indium, zinc, cadmium, tin oxide, aluminum doped zinc oxide, and indium doped cadmium oxide, and wherein the first electrode and the second electrode are in a form of one of: a sheet, a wire, a plate, a foil, or a tape;
   a cation; and
   an electrolyte configured to conductively couple the first conductive polymer and the second conductive polymer, the fused polycyclic aromatic hydrocarbon radical anion, and the cation, wherein the electrolyte includes a liquid electrolyte, an anion, and an ionomer;
   wherein the liquid electrolyte includes one or more of cycloalkylene carbonate and a cycloalkanone;
   wherein the anion forms a salt of the ionomer with the cation, wherein the salt separates the first conductive polymer from the second conductive polymer;
   wherein the first conductive polymer includes one or more of: a poly(fluorene), a polypyrene, a polyazepine, and a poly(phenylene ethynylene), or a combination thereof;
   wherein the first conductive polymer is substituted by the fused polycyclic aromatic hydrocarbon radical anion;
   wherein the fused polycyclic aromatic hydrocarbon radical anion includes an anthracene radical anion;
   wherein the second conductive polymer includes one or more of: a poly(arylene ethynylene), a poly(phenylene ethynylene), and a polycarbazole, or a combination thereof;
   wherein the ionomer contacts the first conductive polymer and the second conductive polymer and includes repeat units selected from one or more of: alkyl, alkyl ether, perfluoroalkyl, perfluoroalkyl ether, sulfonates, phosphates, and carboxylates; and
   wherein the first conductive polymer and the second conductive polymer are one of oxidatively doped and reductively doped to conduct electricity.

2. The electrochemical cell of claim 1, wherein the cation includes an alkali cation, an alkaline earth metal cation, or a mixture thereof.

3. The electrochemical cell of claim 2, wherein the cation includes $Na^+$.

4. The electrochemical cell of claim 1, wherein the first conductive polymer includes a homopolymer, a block copolymer, a random copolymer, or a graft copolymer.

5. The electrochemical cell of claim 1, wherein the cation includes $Na^+$.

6. The electrochemical cell of claim 1, wherein the electrolyte comprises one or more anions selected from a group consisting of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, and nitrate.

7. The electrochemical cell of claim 1, wherein the ionomer comprises a polytetrafluoroethylene-perfluorosulfonic acid copolymer.

8. The electrochemical cell of claim 1, wherein fused polycyclic aromatic hydrocarbon radical anion is in noncovalent contact with the first conductive polymer.

9. An electrochemical cell, comprising:
- a first electrode formed from a first conductive polymer, the first conductive polymer being configured to contact a polycyclic aromatic hydrocarbon;
- a fused polycyclic aromatic hydrocarbon radical anion configured to contact the first conductive polymer;
- a second electrode formed from a second conductive polymer, the second conductive polymer being configured to contact the fused polycyclic aromatic hydrocarbon with a metal that corresponds to a metal cation;
- a cation; and
- an electrolyte configured to conductively couple the first conductive polymer, the second conductive polymer, the fused polycyclic aromatic hydrocarbon radical anion, and the cation, wherein the electrolyte includes a liquid electrolyte, an anion, and an ionomer;
  - wherein the liquid electrolyte includes one or more of cycloalkylene carbonate and a cycloalkanone;
  - wherein the anion forms a salt of the ionomer with the cation, wherein the salt separates the first conductive polymer from the second conductive polymer;
  - wherein the first conductive polymer includes one or more of: a poly(fluorene), a polypyrene, a polyazepine, and a poly(phenylene ethynylene), or a combination thereof;
  - wherein the first conductive polymer is substituted by the fused polycyclic aromatic hydrocarbon radical anion;
  - wherein the fused polycyclic aromatic hydrocarbon radical anion includes an anthracene radical anion;
  - wherein the second conductive polymer includes one or more of: a poly(arylene ethynylene), a poly(phenylene ethynylene), and a polycarbazole, or a combination thereof;
  - wherein the ionomer contacts the first conductive polymer and the second conductive polymer and includes repeat units selected from one or more of: alkyl, alkyl ether, perfluoroalkyl, perfluoroalkyl ether, sulfonates, phosphates, and carboxylates; and
  - wherein the first conductive polymer and the second conductive polymer are one of oxidatively doped and reductively doped to conduct electricity.

10. The electrochemical cell of claim 9, wherein the cation includes $Na^+$.

11. The electrochemical cell of claim 9, wherein the ionomer comprises a polytetrafluoroethylene-perfluorosulfonic acid copolymer.

12. The electrochemical cell of claim 9, wherein the electrolyte comprises one or more anions selected from a group consisting of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, and nitrate.

* * * * *